United States Patent
Kim et al.

(10) Patent No.: US 11,895,217 B2
(45) Date of Patent: Feb. 6, 2024

(54) METHOD FOR TRANSMITTING DATA, AND DEVICE THEREFOR

(71) Applicant: SAMSUNG ELECTRONICS CO., LTD., Suwon-si (KR)

(72) Inventors: Junsuk Kim, Suwon-si (KR); Soomin Lee, Suwon-si (KR); Sangho Lee, Suwon-si (KR); Hyerim Lee, Suwon-si (KR); Hyejeong Kim, Suwon-si (KR); Suyoung Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 174 days.

(21) Appl. No.: 17/601,021

(22) PCT Filed: Mar. 25, 2020

(86) PCT No.: PCT/KR2020/004068
§ 371 (c)(1),
(2) Date: Oct. 1, 2021

(87) PCT Pub. No.: WO2020/204452
PCT Pub. Date: Oct. 8, 2020

(65) Prior Publication Data
US 2022/0174135 A1 Jun. 2, 2022

(30) Foreign Application Priority Data
Apr. 3, 2019 (KR) .................. 10-2019-0038821

(51) Int. Cl.
*H04L 69/321* (2022.01)
*H04L 1/1867* (2023.01)
(Continued)

(52) U.S. Cl.
CPC .......... *H04L 69/321* (2013.01); *H04L 1/1874* (2013.01); *H04L 69/16* (2013.01); *H04W 36/023* (2013.01); *H04W 80/02* (2013.01)

(58) Field of Classification Search
CPC ..... H04L 69/321; H04L 1/1874; H04L 69/16; H04L 1/0026; H04L 1/1893;
(Continued)

(56) References Cited

U.S. PATENT DOCUMENTS

| 8,830,950 B2 | 9/2014 | Meylan |
| 10,367,677 B2 | 7/2019 | Parkvall et al. |

(Continued)

FOREIGN PATENT DOCUMENTS

| WO | 2017/194733 | 11/2017 |
| WO | 2017/196246 | 11/2017 |
| WO | 2018-030798 | 2/2018 |

OTHER PUBLICATIONS

"3GPP TS 38.331, V15.3.0, 3rd Generation Partnership Project; Technical Specification Group Radio Access Network; NR; Radtio Resource Control (RRC) protocol specification", (Release 15), Sep. 2018.

(Continued)

*Primary Examiner* — Mandish K Randhawa
(74) *Attorney, Agent, or Firm* — Nixon & Vanderhye P.C.

(57) ABSTRACT

Disclosed is an electronic device including at least one wireless communication circuit configured to provide a first radio access technology (RAT) and a second RAT, at least one processor operatively connected to the at least one wireless communication circuit and configured to provide a first packet data convergence protocol (PDCP) related to the first RAT and a second PDCP related to the second RAT, a volatile memory operatively connected to the at least one processor and including, in at least a partial region thereof, (Continued)

a first buffer, and a nonvolatile memory operatively connected to the at least one processor or coupled to the processor. The electronic device may change a PDCP version of a data packet based on a change of a PDCP version. Besides, other various embodiments recognized through the present disclosure can be made.

4 Claims, 13 Drawing Sheets

(51) Int. Cl.
*H04L 69/16* (2022.01)
*H04W 36/02* (2009.01)
*H04W 80/02* (2009.01)

(58) Field of Classification Search
CPC .............. H04W 36/023; H04W 80/02; H04W 36/0033; H04W 36/14; H04W 36/0038
See application file for complete search history.

(56) References Cited

U.S. PATENT DOCUMENTS

| | | | |
|---|---|---|---|
| 10,432,291 B2 | 10/2019 | Agiwal et al. | |
| 10,630,410 B2 | 4/2020 | Parkvall et al. | |
| 10,938,497 B2 | 3/2021 | Parkvall et al. | |
| 2004/0039833 A1* | 2/2004 | Ludwig | H04L 9/40 709/230 |
| 2008/0310367 A1 | 12/2008 | Meylan | |
| 2017/0331670 A1 | 11/2017 | Parkvall et al. | |
| 2018/0083688 A1 | 3/2018 | Agiwal et al. | |
| 2018/0227166 A1 | 8/2018 | Palenius et al. | |
| 2018/0234153 A1 | 8/2018 | Lincoln et al. | |
| 2019/0158345 A1 | 5/2019 | Lincoln et al. | |
| 2019/0280819 A1* | 9/2019 | Määttänen | H04L 1/1887 |
| 2020/0028564 A1 | 1/2020 | Agiwal et al. | |
| 2020/0028745 A1 | 1/2020 | Parkvall et al. | |
| 2021/0126726 A1 | 4/2021 | Parkvall et al. | |

OTHER PUBLICATIONS

"3GPP TS 38.323, V16.3.0, 3rd Generation Partnership Project; Technical Specification Group Radio Access Network; NR; Packet Data Convergence Protocol (PDCP) specification", (Release 16), Mar. 2021.

"3GPP TS 37.340, V15.3.0, 3rd Generation Partnership Project; Technical Specification Group Radio Access Network; Evolved Universal Terrestrial Radio Access (E-UTRA) and NR; Multi-connectivity; Stage 2", Release 15), Sep. 2018.

Intel Corporation, Report of email discussion on [104#30][NR] De-activation of security for DRBs (Intel), R2-1900774, 3GPP TSG-RAN WG2#105, Athens, Greece, Feb. 25-Mar. 1, 2019, 22 pages.

LG Electronics, Introducing TM DRB in PDCP,[NR] R2-1805996, 3GPP TSG-RAN WG2#101bis, Sanya, China, Apr. 16-Apr. 20, 2018, 9 pages.

ZTE Corporation, Consideration on the ECN in NR, R2-1708149, 3GPP TSG-RAN WG2 Meeting #99, Berlin, Germany, Aug. 21-25, 2017, 10 pages.

International Search Report dated Jul. 17, 2020 in PCT/KR2020/004068 (4 pages).

Written Opinion dated Jul. 17, 2020 in PCT/KR2020/004068 (4 pages).

* cited by examiner

METHOD FOR TRANSMITTING DATA, AND DEVICE THEREFOR

This application is the U.S. national phase of International Application No. PCT/KR2020/004068 filed 25 Mar. 2020, which designated the U.S. and claims priority to KR Patent Application 10-2019-0038821 filed 3 Apr. 2019, the entire contents of each of which are hereby incorporated by reference.

TECHNICAL FIELD

Various embodiments of the present disclosure relate to a data transmission method and a device therefor.

BACKGROUND ART

After deployment of 4th generation mobile communication networks, researches about 5th generation mobile communication are carried out to address the issue of data traffic increase. In a 5th mobile communication deployment scenario, access to a 5th mobile communication network based on a 4th mobile communication network may be supported. For example, an electronic device may be simultaneously connected to a plurality of cells, which may be associated with different RATs.

In a 5th mobile communication system, an electronic device may communicate with a base station based on a specified protocol stack. For example, the specified protocol stack may include service data adaptation protocol (SDAP), packet data convergence protocol (PDCP), radio link control (RLC), medium access control (MAC), and physical (PHY) layers. At least one data radio bearer (DRB) or signaling radio bearer (SRB) may be established to transfer user plane packets between the electronic device and the base station.

For example, main functions of the SDAP may include at least one of a function of transfer of user plane data, a function of mapping between a quality of service (QoS) flow and a DRB for both downlink (DL) and uplink (UL), a function of marking QoS flow ID in both DL and UL packets, and/or a function of reflective QoS flow to DRB mapping for UL SDAP PDUs. For example, with regard to the SDAP layer device, the electronic device may be configured by an RRC message with respect to whether to use a header of the SDAP layer device or use a function of the SDAP layer device for each PDCP layer device, each bearer, or each logical channel. When the SDAP header is configured, the SDAP layer device may instruct the electronic device to update or reconfigure mapping information about a QoS flow and data bearer of uplink and downlink, using a NAS reflective QoS configuration 1-bit indicator and AS reflective QoS configuration 1-bit indicator. The SDAP header may include QoS flow ID information indicating QoS. The QoS information may be used in data processing priority for supporting a smooth service and/or scheduling information.

For example, main functions of a PDCP device may include at least one of a function of header compression and decompression (e.g., robust header compression (ROHC) only), a function of transfer of user data, a function of in-sequence delivery of upper layer protocol data units (PDUs), a function of out-of-sequence delivery of upper layer PDUs, a function of PDCP PDU reordering for reception, a function of duplicate detection of lower layer service data units (SDUs), a function of retransmission of PDCP SDUs, a function of ciphering and deciphering, and/or a function of timer-based SDU discard in uplink. The reordering function of the PDCP device may be referred to as a function of reordering PDCP PDUs received in a lower layer based on a PDCP sequence number (SN). The reordering function may include a function of delivering data to an upper layer in reordered sequence, a function of delivering data to an upper layer without considering an order, a function of recording missing PDCP PDUs by reordering a sequence, a function of sending a state report about missing PDCP PDUs to a transmission side, and/or a function of requesting retransmission of missing PDCP PDUs.

Main functions of an RLC device may include a function of transfer of data of upper layer PDUs, a function of in-sequence delivery of upper layer PDUs, a function of out-of-sequence delivery of upper layer PDUs, a function of error correction through automatic repeat request (ARQ), a function of concatenation, segmentation, and reassembly of RLC SDUs, a function of re-segmentation of RLC data PDUs, a function of reordering of RLC data PDUs, a function of duplicate detection, a function of protocol error detection, a function of RLC SDU discard, and/or a function of RLC re-establishment. The function of in-sequence delivery of the RLC device may be referred to as a function of delivering RLC SDUs received from a lower layer to an upper layer in sequence. The function of in-sequence delivery may include a function of reassembling and delivering multiple RLC SDUs if a single RLC SDU is received after being segmented into the multiple RLC SDUs, a function of reordering received RLC PDUs based on an RLC sequence number (SN) or PDCP SN, a function of recording missing RLC PDUs by reordering a sequence, a function of sending a state report about missing RLC PDUs to a transmission side, a function of requesting retransmission of missing RLC PDUs, a function of delivering, to an upper layer, only RCL SDUs prior to missing RLC SDUs in sequence if there are missing RCL SDUs, a function of delivering, if a prescribed timer expires, all RLC SDUs received before the timer expires to an upper layer in sequence even if there are missing RLC SDUs, and/or a function of delivering, if a prescribed timer expires, all RLC SDUs received up to the present time to an upper layer in sequence even if there are missing RLC SDUs. Furthermore, the RLC device may process RLC PDUs in the order in which the RLC PDUs are received (e.g., in the order of arrival regardless of an order of sequence numbers) and deliver the RLC PDUs to a PDCP device out of sequence. If received data is segmented data, the RLC layer may receive segments stored in a buffer or to be received later and may reconstruct the segments as a single complete RLC PDU, and, thereafter, may process and deliver the RLC PDU to a PDCP device. The RLC device may not include a concatenation function. The concatenation function may be performed in a MAC layer or may be replaced with a multiplexing function of a MAC layer. The function of out-of-sequence delivery of the RLC device may be referred to as a function of out of sequence delivering RLC SDUs received from a lower layer to an upper layer. The function of out-of-sequence delivery may include a function of reassembling and delivering multiple RLC SDUs if a single RLC SDU is received after being segmented into the multiple RLC SDUs and/or a function of recording missing RLC PDUs by storing and ordering RLC SN or PDCP SN of received RLC PDUs.

A MAC device may be connected to multiple RLC layer devices configured in one terminal. For example, main functions of the MAC may include at least one of a function of mapping between logical channels and transport channels, a function of multiplexing/demultiplexing of MAC SDUs, a function of scheduling information reporting, a function of error correction through hybrid ARQ (HARQ), a function of priority handling between logical channels of one user equipment, a function of priority handling between UEs by means of dynamic scheduling, a function of multimedia broadcast/multicast service (MBMS) service identification, a function of transport format selection, and/or a function of padding.

A PHY layer may channel code and modulate data of an upper layer and render the data into an orthogonal frequency division multiplexing (OFDM) symbol to transmit the OFDM symbol by wireless channel, or may demodulate and channel decode an OFDM symbol received through a wireless channel and deliver the OFDM symbol to an upper layer.

DISCLOSURE OF THE INVENTION

Technical Problem

In the case of handing over an electronic device to another cell supporting the same RAT as a currently connected cell, this handover may be referred to as an intra-RAT handover. In the case of handing over an electronic device to another cell supporting an RAT different from that of a currently connected cell, this handover may be referred to as an inter-RAT handover.

When the electronic device performs the intra-RAT handover, information of ROHC or security key used in a PDCP layer may be changed. In this case, data transmitted by the electronic device using the security key or ROHC information of a source cell before the handover may not be successfully received in a target cell after the handover. Therefore, some PDCP SDUs may be discarded without being transmitted to the target cell after the handover.

When the electronic device performs the inter-RAT handover, the electronic device may transmit from a first PDCP service data unit (SDU) that was not transmitted to the source cell before the handover to the target cell after the handover. For example, when the electronic device operates in an unacknowledged mode (UM), the electronic device may not be aware of whether data transmitted to the source cell before the handover has been successfully received by the source cell. For another example, when the electronic device operates in an acknowledged mode (AM), although the electronic device has transmitted the data in a PDCP layer, the electronic device may fail to receive an acknowledgement of the data in a lower layer (e.g., RLC layer or MAC layer).

In 5th generation mobile communication that supports multi-RAT simultaneous connection, a change may occur in PDCP due to a handover of an electronic device. Therefore, if appropriate data transmission is not performed according to a change in PDCP, data throughput may deteriorate due to data loss.

Various embodiments of the present disclosure may provide an electronic device supporting a data transmission method based on a change in PDCP.

Technical Solution

An electronic device according to an embodiment of the present disclosure may include: at least one wireless communication circuit configured to provide a first radio access technology (RAT) and a second RAT; at least one processor operatively connected to the at least one wireless communication circuit and configured to provide a first packet data convergence protocol (PDCP) related to the first RAT and a second PDCP related to the second RAT; a volatile memory operatively connected to the at least one processor and including, in at least a partial region thereof, a first buffer; and a nonvolatile memory operatively connected to the at least one processor or coupled to the processor, wherein the nonvolatile memory may store instructions that, when executed, cause the at least one processor to: store, during wireless communication based on the first RAT, at least one first data packet related to the first PDCP in the first buffer at least temporarily; change at least a portion of the stored at least one first data packet to at least one second data packet related to the second PDCP when the wireless communication is changed to wireless communication based on the second RAT; and transmit the at least one second data packet using the second PDCP during the wireless communication based on the second RAT.

An electronic device according to an embodiment of the present disclosure may include: at least one wireless communication circuit configured to provide a first radio access technology (RAT) and a second RAT; a processor operatively connected to the at least one wireless communication circuit; and a memory operatively connected to the at least one processor, wherein the memory may store instructions that, when executed, cause the processor to: transmit at least a portion of a plurality of first data packets based on a first packet data convergence protocol (PDCP); identify an event corresponding to changing from the first PDCP to a second PDCP while transmitting the plurality of first data packets; identify, in response to identification of the event, at least one first data packet that is likely to be lost due to the changing to the second PDCP; and determine to retransmit or store the at least one first data packet at least partially based on an attribute of the at least one first data packet.

A data transmission method of an electronic device according to an embodiment of the present disclosure may include: transmitting at least a portion of a plurality of first data packets based on a first packet data convergence protocol (PDCP); identifying an event corresponding to changing from the first PDCP to a second PDCP while transmitting the plurality of first data packets; identifying, in response to identification of the event, at least one first data packet that is likely to be lost due to the changing to the second PDCP among the plurality of first data packets; and determining to retransmit or store the at least one first data packet at least partially based on an attribute of the at least one first data packet.

Advantageous Effects

According to various embodiments of the present disclosure, deterioration of service performance may be prevented through re-processing or retransmission of an unprocessed packet due to a change of PDCP.

According to various embodiments of the present disclosure, overall data throughput of a communication network may be increased by preventing dropping of a data packet.

Besides, various effects may be provided that are directly or indirectly identified through the present disclosure.

BRIEF DESCRIPTION OF THE DRAWINGS

With regard to descriptions of the drawings, the same or similar reference numerals may be used for the same or similar components.

MODE FOR CARRYING OUT THE INVENTION

Hereinafter, various embodiments of the present disclosure will be described with reference to the accompanying drawings. It should be understood that the embodiments and the terms used herein are not intended to limit the technology described in the present disclosure to specific embodiments, but rather include various modifications, equivalents and/or alternatives of the embodiments.

Figure 1:
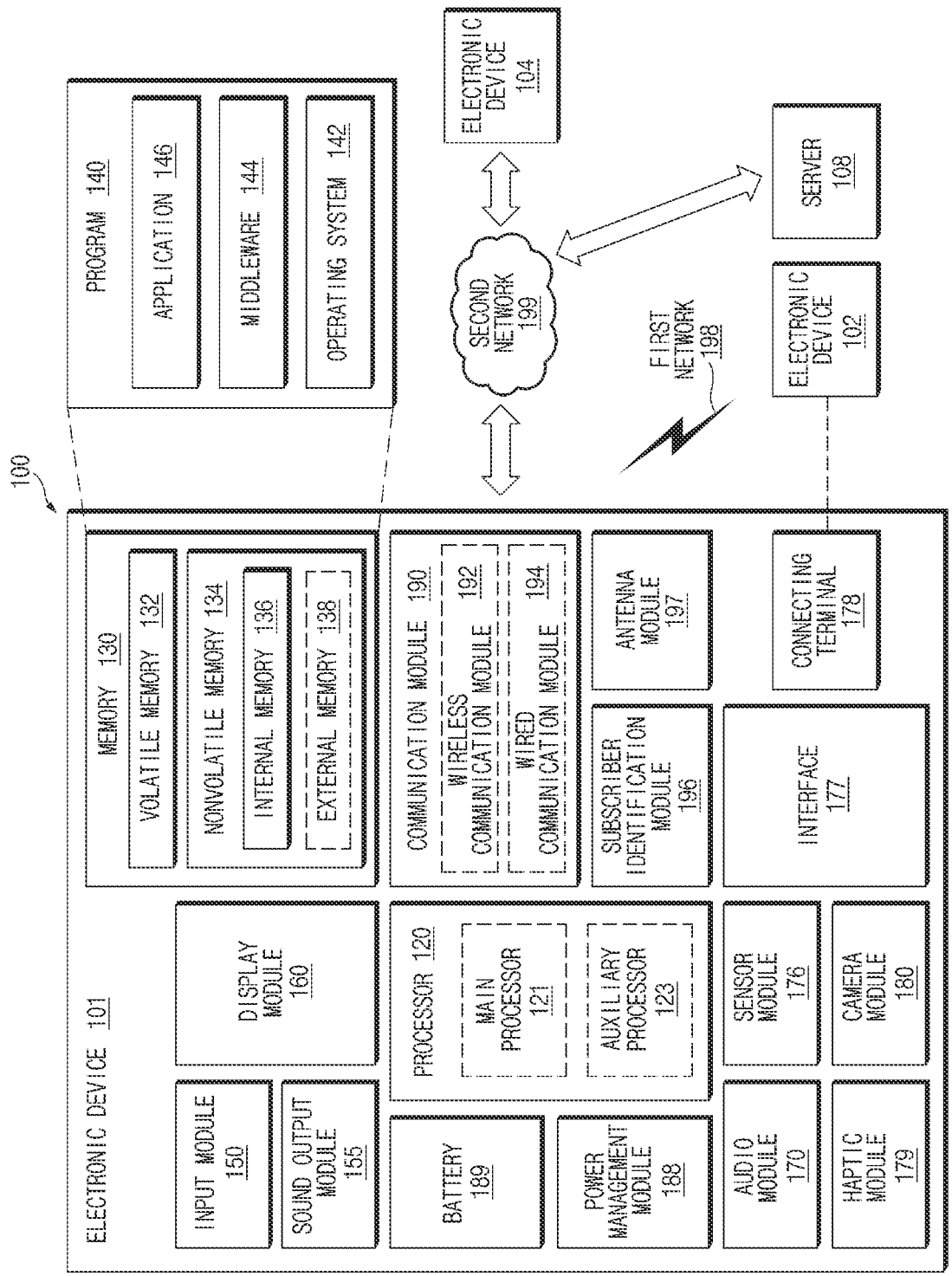
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
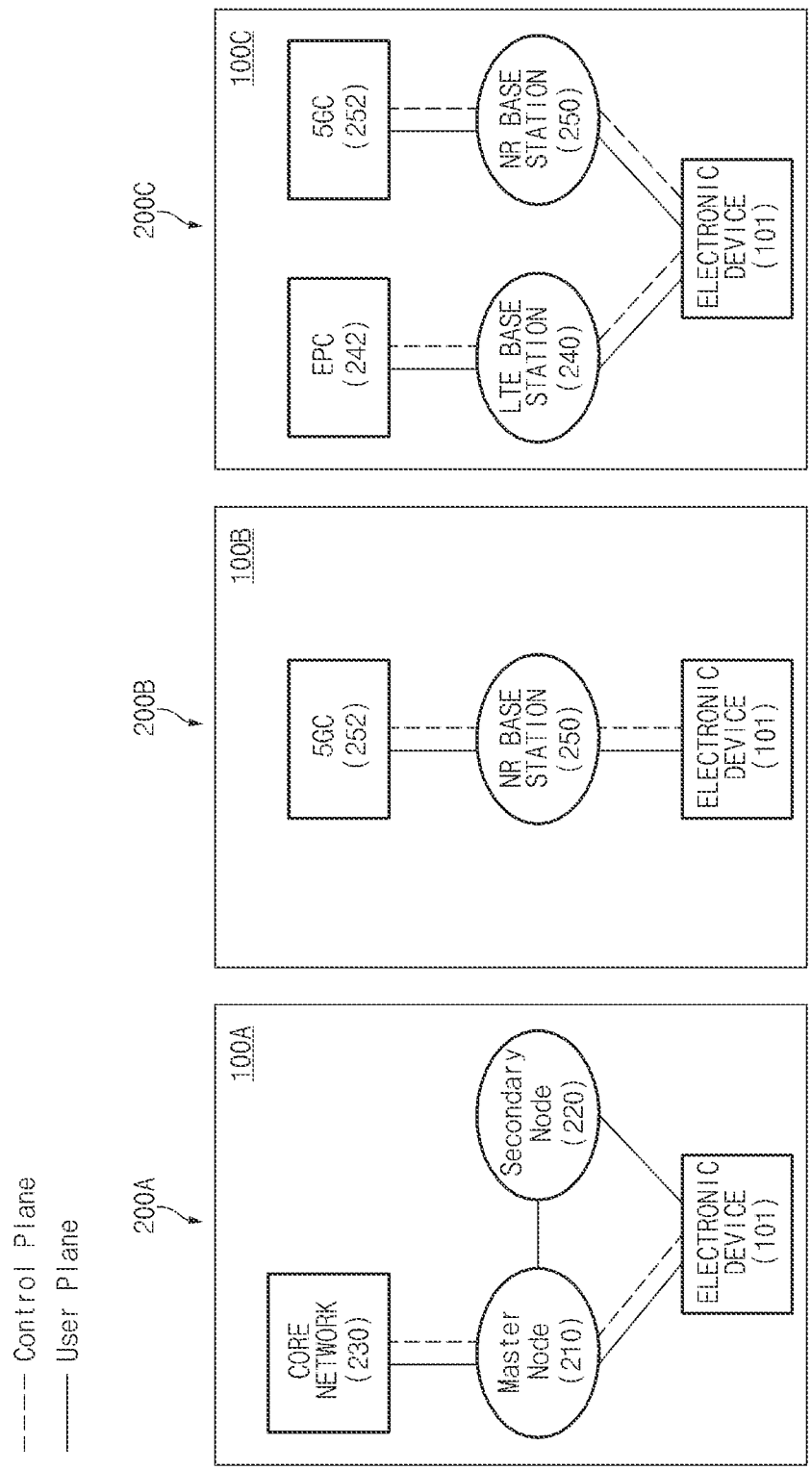
FIG. 2 illustrates wireless communication systems that provide networks of legacy communication and/or 5G communication according to various embodiments.

FIG. 2 illustrates wireless communication systems that provide networks of legacy communication and/or 5G communication according to various embodiments.

Referring to FIG. 2, network environments 100A, 100B, and 100C may include at least one of a legacy network or a 5G network. The legacy network may include, for example, a 4G or LTE base station 250 (e.g., eNodeB (eNB)) of a 3rd Generation Partnership Project (3GPP) standard supporting a wireless connection with an electronic device 101 and an evolved packet core (EPC) 251 for managing 4G communication. The 5G network may include, for example, a new radio (NR) base station 250 (e.g., gNodeB (gNB)) supporting a wireless connection with the electronic device 201 and a 5th generation core (5GC) 252 for managing 5G communication of the electronic device 101.

According to various embodiments, the electronic device 101 may transmit/receive a control message and user data through legacy communication and/or 5G communication. The control message may include, for example, a message related to at least one of security control, bearer setup, authentication, registration, or mobility management of the electronic device 101. The user data may represent, for example, user data except for the control message transmitted/received between the electronic device 101 and a core network 230 (e.g., EPC 242).

Referring to reference number 200A, the electronic device 101 according to an embodiment may transmit/receive at least one of a control message or user data to/from at least a portion (e.g., NR base station 250, 5GC 252) of a 5G network using at least a portion (e.g., LTE base station 240, EPC 242) of a legacy network.

According to various embodiments, the network environment 100A may include a network environment, in which multi-radio access technology (RAT) dual connectivity (MR-DC) to the LTE base station 240 and the NR base station 250 is provided, and a control message is transmitted/received to or from the electronic device 101 through the core network 230 of one of the EPC 242 and the 5GC 252.

According to various embodiments, in an MR-DC environment, one of the LTE base station 240 and the NR base station 250 may operate as a master node (MN) 210, and the other may operate as a secondary node (SN) 220. The MN 210 may be connected to the core network 230 so as to transmit/receive a control message. The MN 210 and the SN 220 may be connected through a network interface so as to transmit/receive a message related to a radio resource (e.g., communication channel) to/from each other.

According to various embodiments, the MN 210 may be configured as the LTE base station 250, the SN 220 may be configured as the NR base station 250, and the core network 230 may be configured as the EPC 242. For example, a control message may be transmitted/received through the LTE base station 240 and the EPC 242, and user data may be transmitted/received through the LTE base station 250 and the NR base station 250.

Referring to reference number 200B, according to various embodiments, a 5G network may transmit/receive a control message and user data independently of the electronic device 101.

Referring to reference number 200C, a legacy network and 5G network according to various embodiments may provide data transmission/reception independently of each other. For example, the electronic device 101 and the EPC 242 may transmit/receive a control message and user data through the LTE base station 250. For another example, the electronic device 101 and the 5GC 252 may transmit/receive a control message and user data through the NR base station 250.

According to various embodiments, the electronic device 101 may be registered in at least one of the EPC 242 or the 5GC 252 so as to transmit/receive a control message.

According to various embodiments, the EPC 242 or the 5GC 252 may manage communication of the electronic device 101 via an interworking. For example, movement information of the electronic device 101 may be transmitted/received through an interface between the EPC 242 and the 5GC 252.

Figure 3:
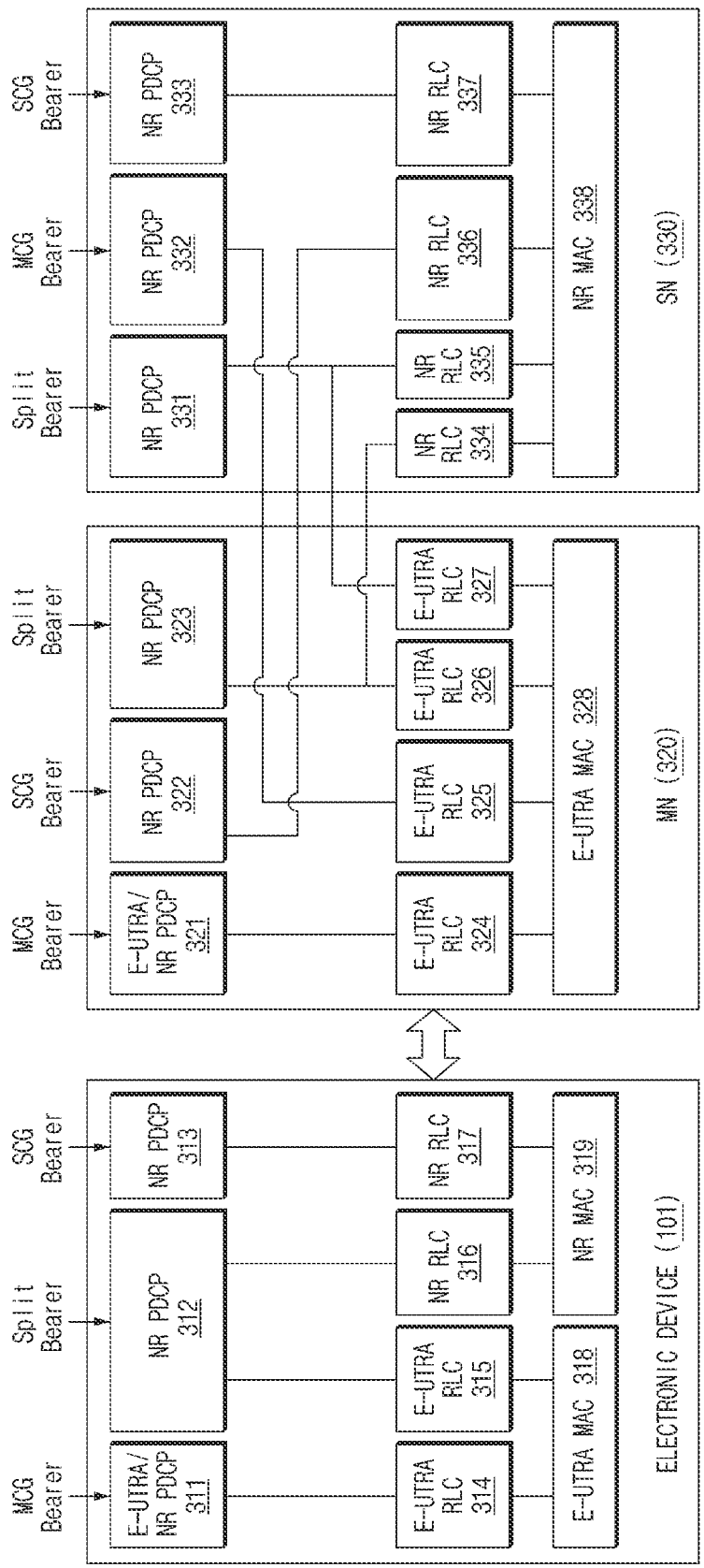
FIG. 3 illustrates protocol stack structures of a network and electronic device according to embodiments.

FIG. 3 illustrates protocol stack structures of a network and electronic device according to embodiments.

According to an embodiment, in a mobile communication system, a base station may communicate with a terminal (e.g., the electronic device 101 of FIG. 1) by selectively using an evolved universal mobile telecommunication system (UMTS) terrestrial radio access (E-UTRA) communication protocol (or LTE communication protocol) and a new radio (NR) communication protocol. For example, the base station and the terminal may communicate using the E-UTRA communication protocol or the NR communication protocol. According to an embodiment, the base station and the terminal may communicate in an MR-DC network environment (e.g., the network environment 100A of FIG. 2). In this case, for example, the base station and the terminal may interchangeably use at least a portion of the E-UTRA communication protocol and at least a portion of the NR communication protocol. For example, the terminal may use different communication protocols for each layer.

In the embodiments described below, an E-UTRA protocol stack may be referred to as a first communication protocol stack or a first protocol stack. The first protocol or first communication protocol may be referred to as an E-UTRA protocol (or LTE protocol). In the embodiments described below, an NR protocol stack may be referred to as a second communication protocol stack or a second protocol stack. The second protocol or second communication protocol may be referred to as an NR protocol. For example, the electronic device 101 may execute the first communication protocol stack and the second communication protocol stack using at least one communication processor (e.g., the wireless communication module 192 of FIG. 1) included in the electronic device 101.

According to an embodiment, the first communication protocol stack and the second communication protocol stack may include a control plane protocol for transmitting/receiving a control message and a user plane protocol for transmitting/receiving user data. The control message may include, for example, a message related to at least one of security control, bearer setup, authentication, registration, or mobility management. The user data may include, for example, data except for the control message.

According to an embodiment, the control plane protocol and the user plane protocol may include physical (PHY), medium access control (MAC), radio link control (RLC), or packet data convergence protocol (PDCP) layers. The PHY layer, for example, may channel code and modulate data received from an upper layer (e.g., MAC layer) to transmit the data by a wireless channel, and may demodulate and decode data received through a wireless channel to deliver the data to an upper layer. The PHY layer included in the second communication protocol stack may further perform an operation related to beam forming. The MAC layer, for example, may logically/physically map to a wireless channel through which data is to be transmitted/received, and may perform hybrid automatic repeat request (HARQ) for error correction. The RLC layer, for example, may concatenate, segment, or reassemble data, and may check an order of data, reorder data, or check duplication of data. The PDCP layer, for example, may further perform an operation related to data integrity and ciphering of a control message and user data. The second communication protocol stack may further include a service data adaptation protocol (SDAP). The SDAP, for example, may manage radio bearer allocation based on quality of service (Qos) of user data.

According to various embodiments, the control plane protocol may include a radio resource control (RRC) layer and a non-access stratum (NAS) layer. The RRC layer, for example, may process a control message related to radio bearer setup, paging, or mobility management. The NAS, for example, may process a control message related to authentication, registration, and/or mobility management.

Referring to FIG. 3, the protocol stack of the electronic device 101 may include at least one of an E-UTRA/NR PDCP 311, NR PDCP 312, NR PDCP 313, E-UTRA RLC 314, E-UTRA RLC 315, NR RLC 316, NR RLC 317, E-UTRA MAC 318, and/or NR MAC 319. For example, a master node (MN) 320 (e.g., the master node 210 of FIG. 2) may include at least one of an E-UTRA/NR PDCP 321, NR PDCP 322, NR PDCP 323, E-UTRA RLC 324, E-UTRA RLC 325, E-UTRA RLC 326, E-UTRA RLC 327, and/or E-UTRA MAC 328. For example, a secondary node (SN)

330 (e.g., the secondary node 220 of FIG. 2) may include an NR PDCP 331, NR PDCP 332, NR PDCP 333, NR RLC 334, NR RLC 335, NR RLC 336, NR RLC 337, and NR MAC 338.

For example, the electronic device 101 may communicate with the MN 320 using a master cell group (MCG) bearer, and may communicate with the SN 330 using a secondary cell group (SCG) bearer. In this case, a protocol stack of the electronic device 101 associated with the MCG bearer may include an E-UTRA protocol stack (e.g., E-UITRA/NR PDCP 311, E-UTRA RLC 314, and E-UTRA MAC 318). A protocol stack of the electronic device 101 associated with the SCG bearer may include an NR protocol stack (e.g., NR PDCP 313, NR RLC 317, and NR MAC 319).

For another example, the electronic device 101 may communicate with the MN 320 and the SN 330 using a split bearer (e.g., MCG split bearer or SCG split bearer). In this case, a protocol stack of the electronic device 101 associated with the split bearer may include the NR PDCP 312, E-UTRA RLC 315, NR RLC 316, E-UTRA MAC 318, and NR MAC 310. In the case of the split bearer, the electronic device 101 may use an NR protocol stack (e.g., NR PDCP 312) in a PDCP layer, but may use an E-UTRA protocol stack (e.g., E-UTRA RLC 315) in a lower layer (e.g., RLC/MAC/PHY). In this case, the NR PDCP 312 may separate and/or aggregate data received through the split bearer and deliver the data to the E-UTRA RLC 315 or NR RLC 316.

For another example, the electronic device 101 may communicate with the SN 330 using a secondary node (SN) terminated MCG bearer. In this case, the electronic device 101 may use an NR protocol stack (e.g., E-UTRA/NR PDCP 311) in a PDCP layer, but may use an E-UTRA protocol stack (e.g., E-UTRA RLC 314 and E-UTRA MAC 318) in RLC and MAC layers.

For another example, the electronic device 101 may communicate with the MN 320 using a master node (MN) terminated SCG bearer. In this case, the electronic device 101 may include an NR protocol stack (e.g., NR PDCP 313, NR RLC 317, and NR MAC 319) in PDCP, RLC, and MAC layers.

As described in the above-mentioned examples, various types of bearers (e.g., MCG bearer, SCG bearer, MCG split bearer, SCG split bearer, MN terminated SCG bearer, and/or SN terminated MCG bearer) may be used in communication between the electronic device 101 and each node (e.g., MN 320 and/or SN 330). In this communication environment, the type of a bearer used in communication of the electronic device 101 may be changed. For example, the electronic device 101 may move from a first cell that supports EN-DC to a second cell that does not support EN-DC. In this case, the electronic device 101, according to a change of a cell type, may change a bearer type to a bearer that differs in type from a bearer configured based on an EN-DC environment. For another example, the electronic device 101 may use a bearer based on the NR PDCP 312 supporting EN-DC. In this case, the type of a bearer associated with the electronic device 101 may be changed according to determination of a network. The type of a bearer associated with the electronic device 101 may be changed from a bearer based on the NR PDCP 312 to a bearer based on the E-UTRA PDCP 311.

Figure 4:
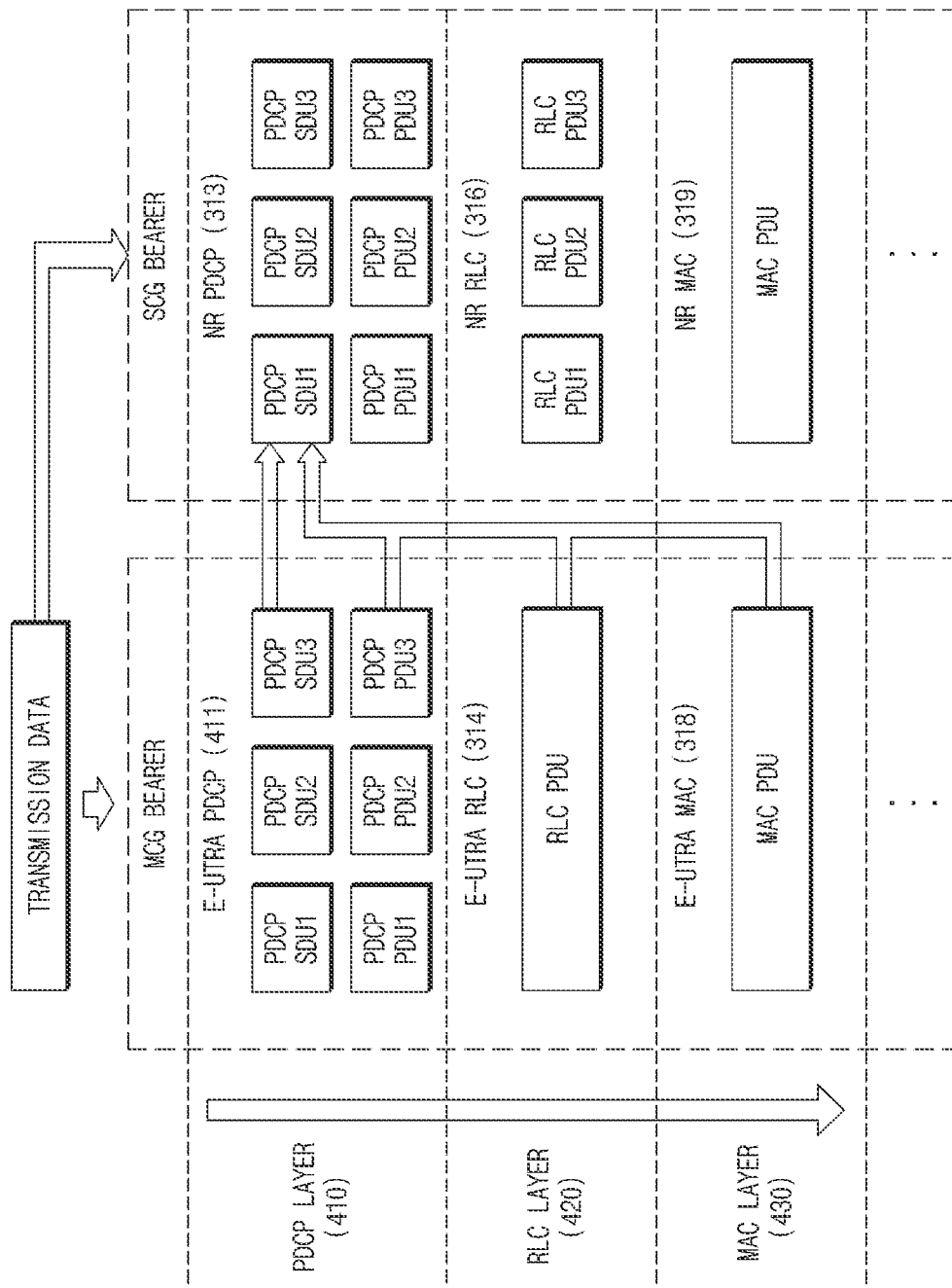
FIG. 4 illustrates a data processing flow between network protocol stacks according to an embodiment.

FIG. 4 illustrates a data processing flow between network protocol stacks according to an embodiment.

The type of a bearer may be changed since a base station with which an electronic device (e.g., the electronic device 101 of FIG. 1) communicates is changed due to movement of the electronic device 101.

According to an embodiment, the electronic device 101 may perform Internet communication associated with an external electronic device (e.g., the server 108 of FIG. 1) using an Internet protocol (e.g., TCP, UDP, IP). For example, the electronic device 101 may process data according to an Internet protocol in a main processor (e.g., the main processor 121 of FIG. 1) included in the electronic device 101. For example, the electronic device 101 may process transmission data according to an Internet protocol. The electronic device 101 may process the transmission data (e.g., IP packet) processed according to an Internet protocol, according to the type of a bearer associated with the electronic device 101.

For example, a PDCP associated with a bearer may be changed according to a change of the type of the bearer associated with the electronic device 101. For example, when the electronic device 101, during MR-DC operation, moves to an LTE base station eNB not supporting MR-DC or moves to a cell controlled by MME not supporting MR-DC, a PDCP version (e.g., E-UTRA PDCP 411 (e.g., E-UTRA/NR PDCP 311)) used in the bearer associated with the electronic device 101 may be changed. For another example, when the electronic device 101 connected only to an LTE cell moves to a cell supporting MR-DC, the type of the bearer may be changed to a split bearer or SCG bearer. Therefore, in network deployment in which multiple RATs are present, a change of PDCP may occur since the type of a bearer associated with the electronic device 101 is changed due to movement of the electronic device 101. Since the types of various bearers are changed, a protocol stack for the electronic device 101 to process data associated with a bearer may also be changed. As a protocol stack is changed, there may be a packet that is lost without being processed in layer 1 (e.g., physical layer) and/or layer 2 (e.g., PDCP layer 410, RLC layer 420, and/or MAC layer 430).

For example, the electronic device 101 may communicate with an MN (e.g., the MN 320 of FIG. 3) using an MCG bearer. In this case, the electronic device 101 may process pieces of transmission data according to an E-UTRA protocol using the E-UTRA PDCP 411 in the PDCP layer 410. For example, the electronic device 101 may use a plurality of IP packets of the transmission data as PDCP SDUs. The electronic device 101, in the PDCP layer 410, may generate a PDCP PDU by adding an E-UTRA PDCP header to a PDCP SDU, and may deliver the generated PDCP PDU to the RLC layer 420. The electronic device 101, in the RLC layer 420, may concatenate a plurality of PDCP PDUs based on an amount of uplink resources allocated using the E-UTRA RLC 314 and may add an E-UTRA RLC header to thereby generate an RLC PDU, and may deliver the generated RLC PDU to the MAC layer 430. The electronic device 101, in the MAC layer 430, may generate a MAC PDU by adding a MAC header to an RLC PDU using the E-UTRA MAC 318, and may deliver the generated MAC PDU to a lower layer (e.g., PHY layer (not shown)).

For example, the electronic device 101 may communicate with an SN (e.g., the SN 330 of FIG. 3) using an SCG bearer. In this case, the electronic device 101 may process pieces of transmission data according to an NR protocol using the NR PDCP 313 in the PDCP layer 410. For example, the electronic device 101 may use a plurality of IP packets of the transmission data as PDCP SDUs. The electronic device 101, in the PDCP layer 410, may generate a PDCP PDU by adding an NR PDCP header to a PDCP SDU, and may deliver the generated PDCP PDU to the RLC layer 420. The electronic device 101, in the RLC layer 420, may generate RLC PDUs by adding an RLC header to each of a plurality of RLC SDUs using the NR RLC 316, and may deliver the generated RLC PDUs to the MAC layer 430. The electronic device 101, in the MAC layer 430, may generate a MAC PDU by concatenating RLC PDUs based on uplink resources allocated using the E-UTRA MAC 318 and then adding a MAC header, and may deliver the generated MAC PDU to a lower layer (e.g., PHY layer (not shown)).

In the data processing flow according to a bearer type according to various embodiments, the type of a bearer associated with the electronic device 101 may be changed. In the example of FIG. 4, for example, the bearer type may be changed to an SCG bearer. In this case, at least a portion of data may have been processed in association with the MCG bearer, but pieces of the data that were not transmitted may be lost. According to various embodiments of the present disclosure, the electronic device 101 may prevent data loss due to a change of a bearer type. For example, in the example of FIG. 4, the bearer associated with the electronic device 101 may be changed from the MCG bearer to the SCG bearer. For example, when there is a PDCP SDU of data that may be lost, the electronic device 101 may process the PDCP SDU using the NR PDCP 313. For another example, when data corresponding to data that may be lost is present in a lower layer (e.g., RLC layer 420, MAC layer 430, PHY layer (not shown)) of the PDCP layer 410, the electronic device 101 may obtain a PDCP SDU from data of the lower layer, and may process the PDCP SDU using the NR PDCP 313. For another example, when a PDCP SDU of data that may be lost is not present, and is not present also in the lower layer of the PDCP layer 410, the electronic device 101 may retransmit transmission data according to a network protocol corresponding to the SCG bearer.

According to various embodiments, the electronic device 101 may ensure transmission of data according to a change of a PDCP version. For example, the change of the PDCP version may include a security key change, ROHC information change, and/or change between NR PDCP and E-UTRA PDCP. Hereinafter, the PDCP version change may be referred to as a PDCP change. According to an embodiment, the electronic device 101 may estimate a data loss (e.g., identify or estimate a change of PDCP), and may perform reprocessing and/or transmission of data to be lost.

According to an embodiment, the electronic device 101 may identify a PDCP change. For example, the electronic device 101 may identify the PDCP change by identifying an inter-RAT handover. For another example, the electronic device 101 may identify the PDCP change by estimating a handover. For example, the electronic device 101 may identify the PDCP change by estimating a handover based on a communication state (e.g., signal to interference plus noise ratio (SINR), received signal strength indicator (RSSI)).

According to various embodiments, the electronic device 101 may identify a data packet to be lost in response to identification of the PDCP change. For example, the electronic device 101 may identify, as data packets to be lost, data packets corresponding to a PDCP SDU that was delivered to a lower layer of the PDCP layer 410 but was not transmitted in a physical layer. For another example, the electronic device 101 may identify, as data packets that are likely to be lost, data packets corresponding to a PDCP SDU that was delivered to a lower layer but was not transmitted in a physical layer, when a PDCP SDU is deleted after being delivered to the lower layer (e.g., in the case of RLC unacknowledged mode (UM)).

For example, a security key and/or ROHC information may be changed according to a handover within the same RAT. In an RRC connection re-establishment procedure according to an intra-RAT handover, the electronic device 101, in the PDCP layer 410, may process data based on an RLC mode (e.g., RLC acknowledged mode (AM) or RCL RLC UM) and a radio bearer type. For example, in the case of a data radio bearer (DRB) of RLC AM, the electronic device 101 may store a PDCP SDU in a memory (e.g., the memory 190 of FIG. 1) at least temporarily until an acknowledgement of the PDCP SDU is received. In the case of an intra-RAT handover, the electronic device 101 may re-process PDCP SDUs, for which an acknowledgement has not been received from a lower layer, or PDCP SDUs not processed yet by using changed ROHC information and/or security key, and may transmit or retransmit the re-processed PDCP SDUs through a DRB. For another example, in the case of a DRB and signaling radio bearer (SRB) of RLC UM, the electronic device 101 may delete a PDCP SDU after delivering the PDCP SDU to a lower layer.

According to an embodiment, the electronic device 101 may store at least a portion of data (e.g., data packet predicted to be lost) that satisfies a specified condition in a memory (e.g., the volatile memory 132 of FIG. 1) at least temporarily. For example, the electronic device 101 may identify, as the data satisfying the specified condition, data that was delivered from the PDCP layer 410 to a lower layer but was not transmitted, data that was delivered from the PDCP layer 410 to a lower layer but an RLC ACK was not received, or data that was delivered from the PDCP layer to a lower layer in the RLC UM but was not transmitted in a physical layer. According to an embodiment, if the specified condition is satisfied, the electronic device 101 may store a PDCP SDU in the memory 132 at least temporarily during at least a partial time period. For example, the electronic device 101 may identify whether the specified condition is satisfied based on a channel state (e.g., reception channel state) of the electronic device 101 or a channel state history. For example, the electronic device 101 may estimate an event (e.g., handover) in which loss of a PDCP SDU is predicted, based on a channel connection state. If data loss is estimated, the electronic device 101 may store a PDCP SDU in the memory 132 at least temporarily. For another example, the electronic device 101 may identify whether the specified condition is satisfied, based on QoS. In order to ensure service quality of a PDCP PDCP SDU based on QoS, it may be determined to store a PDCP SDU for fast retransmission of the PDCP SDU. According to various embodiments, it may be determined whether to store (e.g., buffer) a data packet based on PDCP SDU information (e.g., IP packet information) of data (e.g., data packet predicted to be lost) satisfying the specified condition. For example, after storing a data packet predicted to be lost based on the determination on whether to store, the electronic device 101 may re-process and/or transmit the stored data packet after PDCP is changed.

Referring to FIG. 4, in lower layers of the PDCP layer 410, the first communication protocol stack and the second communication protocol stack may differ in concatenation structure.

According to an embodiment, the electronic device 101 may generate a PDCP SDU through reverse conversion of a data packet predicted to be lost. For example, a MAC PDU of the first communication protocol stack may be identified as data predicted to be lost (hereinafter referred to as loss-predicted data), and a PDCP SDU corresponding to the MAC PDU may be in a deleted state. In this case, when handing over the electronic device 101 to a cell corresponding to the second communication protocol stack, the electronic device 101 may generate a plurality of PDCP SDUs from the MAC PDU through reverse conversion for the MAC PDU generated by the E-UTRA MAC 318. For example, the electronic device 101 may store the PDCP SDUs generated through reverse conversion in a memory of the electronic device 101 at least temporarily.

According to an embodiment, the electronic device 101 may store a data packet predicted to be lost in a volatile memory (e.g., PDCP buffer) at least temporarily. For example, the electronic device 101 may estimate that an inter-RAT handover will occur based on a channel state, and may store, in a PDCP buffer, a PDCP SDU of a certain time after the estimation. In an embodiment, the electronic device 101 may store, in a memory at least temporarily, a data packet predicted to be lost in a form of a PDCP PDU including a PDCP header and PDCP SDU.

According to an embodiment, after a handover, the electronic device 101 may process a plurality of stored PDCP SDUs according to the second communication protocol stack and then may transmit the PDCP SDUs. For example, the electronic device 101 may generate a PDCP PDU by adding, to the plurality of stored PDCP SDUs, a PDCP header corresponding to the second communication protocol stack and may transmit the PDCP PDU. For another example, in the case where a data packet is stored in a form of PDCP PDU in the volatile memory 132, the electronic device 101 may remove an existing PDCP header and add a PDCP header corresponding to the second communication protocol stack to generate and transmit a PDCP.

The operations of the electronic device 101 described above with reference to FIG. 4 are examples, and embodiments of the present disclosure are not limited thereto.

Figure 5:
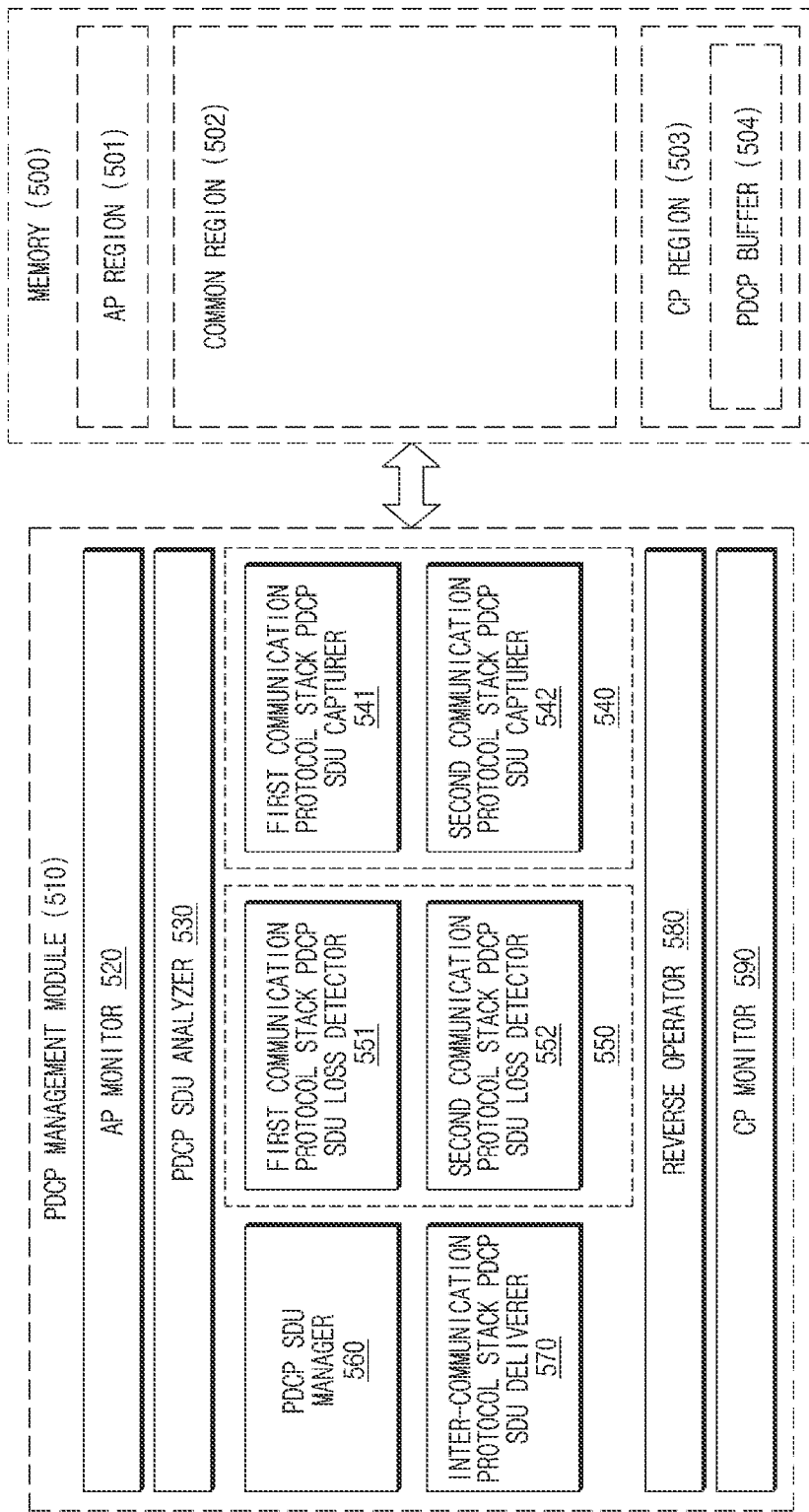
FIG. 5 illustrates a structure of a PDCP management module according to various embodiments.

FIG. 5 illustrates a structure of a PDCP management module 510 according to various embodiments.

According to various embodiments, the PDCP management module 510 may control data processing and transmission according to a change of PDCP. For example, the PDCP management module 510 may be operated by an application processor (AP) (e.g., the processor 120 of FIG. 1) and/or a communication processor (CP) (e.g., the communication module 190 of FIG. 1). The PDCP management module 510 may be a logical module (or software module) operated by the AP and/or CP on a memory 500. For example, the PDCP management module 510 may be implemented on the memory 500 when instructions stored in a nonvolatile memory (e.g., the nonvolatile memory 134 of FIG. 1) of an electronic device (e.g., the electronic device 101 of FIG. 1) are executed by the AP and/or CP. The components of the PDCP management module 510 illustrated in FIG. 5 are divided according to logic and/or function, and embodiments of the present disclosure are not limited to the components illustrated in FIG. 5. For example, at least a portion of the components of the PDCP management module 510 illustrated in FIG. 5 may be omitted. For another example, the PDCP management module 510 may further include a component not illustrated in FIG. 5.

According to various embodiments, the memory 500 may be a volatile memory (e.g., the volatile memory 132 of FIG. 1). For example, the memory 500 may include an AP region 501 accessed and controlled by the AP, a common region 502 accessed and controlled by the AP and CP, and a CP region 503 accessed and controlled by the CP. For example, the AP region 501, the common region 502, and the CP region 503 may be divided by an address of the memory 500.

According to an embodiment, at least a portion of the PDCP management module 510 may be located in the AP region 501. According to an embodiment, at least a portion of the PDCP management module 510 may be located in the CP region 503. The location of the PDCP management module 510 on the memory 500 illustrated in FIG. 5 is an example, and embodiments of the present disclosure are not limited thereto.

According to various embodiments, the CP region 503 may include a PDCP buffer 504. The PDCP buffer 504, which is a storage space for buffering PDCP data (e.g., PDCP SDU or PDCP PDU), may be a memory region within a specified address range. For example, the PDCP buffer 504 may include a region of an address range accessible by all of PDCP layers having different versions.

According to various embodiments, the PDCP management module 510 may include an AP monitor 520, a PDCP SDU analyzer 530, a PDCP SDU capturer 540, a PDCP SDU loss detector 550, a PDCP SDU manager, an inter-communication protocol stack PDCP SDU deliverer 570, a reverse operator 580, and/or a CP monitor 590.

According to an embodiment, the AP monitor 520 may monitor a situation of the AP, and may deliver the monitored situation of the AP to the PDCP SDU manager 560. For example, the situation of the AP may include a CPU load factor and/or a situation of a transmission path (e.g., peripheral component interconnect express (PCIE)) between AP-CP. For example, the PDCP SDU manager 560 may determine, by using the CPU load factor, a possibility of processing of data corresponding to a PDCP SDU required to be retransmitted in the AP. For another example, the PDCP SDU manager 560 may determine an available capacity for data delivery from the AP to the CP based on the situation of the transmission path between AP-CP. The CPU load factor and the situation of the transmission path between AP-CP are examples, and the AP monitor 520 may monitor and report various situations of the AP.

According to an embodiment, the PDCP SDU analyzer 530 may identify a characteristic of a PDCP SDU by analyzing the PDCP SDU (e.g., IP data packet) delivered from the AP or an upper layer. For example, the PDCP SDU analyzer 530 may identify the characteristic of the PDCP SDU based on information (e.g., transmission protocol) of an IP data packet included in the PDCP SDU. According to an embodiment, the PDCP SDU analyzer 530 may determine whether to store the PDCP SDU based on the characteristic of the PDCP SDU. When determining whether to store the PDCP SDU, the electronic device 101 may use a result of identifying or estimating a data loss (e.g., PDCP change). If it is determined to store the PDCP SDU, the PDCP SDU analyzer 530 may cause the PDCP SDU capturer 540 to store the identified PDCP SDU or corresponding PDCP PDU in the common region 502 or the PDCP buffer 504. For example, the PDCP SDU analyzer 530 may identify the information of an IP packet using an IP header of the IP packet included in the PDCP SDU. According to an embodiment, the PDCP SDU analyzer 530 may identify, based on the identified IP packet information, whether the PDCP SDU is a PDCP SDU re-transmittable in an upper layer (e.g., upper layer of a PDCP layer). For example, if the characteristic of the PDCP SDU is a transmission control protocol (TCP), the electronic device 101 may retransmit the PDCP SDU from an upper layer of a PDCP layer based on whether ACK/NACK is received. For another example, if the characteristic of the PDCP SDU is a user datagram protocol (UDP), the electronic device 101 may not retransmit the PDCP SDU from the upper layer of the PDCP layer regardless of whether ACK/NACK is received. For example, since a retransmission protocol is not ensured in an upper layer if the PDCP SDU is a UDP packet, the PDCP SDU analyzer 530 may determine to store the PDCP SDU or corresponding PDCP PDU in the common region 502 or the PDCP buffer 504. For example, the electronic device 101 may store the PDCP SDU or PDCP PDU in the common region 502 or the PDCP buffer 504 until a specified condition is satisfied during a specified time.

According to an embodiment, the PDCP SDU analyzer 530 may determine to store the PDCP SDU re-transmittable in an upper layer. For example, the PDCP SDU analyzer 530 may determine to store the PDCP SDU corresponding to a TCP packet based on QoS of a terminal. For example, in order to ensure service quality of the terminal based on QoS, the PDCP SDU 530 may determine to store the PDCP SDU for fast retransmission of the PDCP SDU. For example, the PDCP SDU analyzer 530 may determine to store the PDCP SDU based on a current channel state of the electronic device 101 or a channel state history. For example, the PDCP 530 may estimate an event (e.g., handover) in which loss of a PDCP SDU is predicted, based on the channel state or the channel state history, and may determine to store a PDCP SDU of at least a portion of PDCP or a corresponding PDCP PDU in response to prediction of the loss. If a PDCP SDU is deleted from a memory region corresponding to a PDCP layer, the common region 502, and/or the PDCP buffer 504 when it is determined to store the PDCP SDU, the PDCP SDU analyzer 530 may restore the PDCP SDU from a PDCP PDU and packets in a lower layer using the reverse operator 580.

According to an embodiment, the PDCP SDU capturer 540 may capture and store PDCP SDUs for retransmission or reprocessing based on a determination of the PDCP SDU analyzer 530. For example, the PDCP SDU capturer 540 may store a PDCP SDU or corresponding PDCP PDU captured in the PDCP buffer 504. For example, in the RLC AM, the PDCP SDU capturer 540 may store the PDCP SDU or corresponding PDCP PDU until an acknowledgement response of an RLC layer, corresponding to the stored PDCP SDU or corresponding PDCP PUD, is received. For another example, with regard to data (e.g., data transmitted in the RLC UM or UDP data packet) for which an acknowledgement response is not required, the PDCP SDU capturer 540 may store the PDCP SDU or corresponding PDCP PDU during a specified time. The PDCP SDU or corresponding PDCP PDU stored by the PDCP SDU capturer 540 may be in a ciphered state or deciphered state. In the case of the ciphered state, when the PDCP SDU stored by the PDCP SDU manager 560 is processed, deciphering of the PDCP SDU may be additionally performed. According to an embodiment, the PDCP SDU capturer 540 may include a first communication protocol stack PDCP SDU capturer 541 for the first communication protocol stack and a second communication protocol stack PDCP SDU capturer 542 for the second communication protocol stack.

According to an embodiment, the PDCP SDU loss detector 550 may detect a PDCP SDU predicted to be lost due to a change of PDCP. In order to detect a PDCP SDU predicted to be lost, the PDCP SDU loss detector 550 may identify a cause of deletion of a PDCP SDU when the PDCP SDU is deleted from a PDCP layer. According to an embodiment, the PDCP SDU loss detector 550 may distinguish whether the PDCP SDU is deleted since the PDCP SDU has been transmitted normally through a physical layer or since the PDCP SDU is not processed due to a change of PDCP. For example, the PDCP SDU loss detector 550 may identify the cause of deletion of the PDCP SDU by identifying whether data corresponding to the PDCP SDU has been transmitted normally in a physical layer. For another example, in the RLC AM, the PDCP SDU loss detector 550 may identify the cause of deletion of the PDCP SDU based on a result of ACK/NACK in an RLC layer. According to an embodiment, the PDCP SDU loss detector 550 may be present for each wireless interface (e.g., radio access technology) corresponding to an independent PDCP version. For example, the PDCP SDU loss detector 550 may include a first communication protocol stack PDCP SDU loss detector 551 and a second communication protocol stack PDCP SDU loss detector 552.

According to various embodiments, with regard to a PDCP SDU predicted to be lost, the PDCP SDU manager 560 may determine whether to process the PDCP SDU through CP internal processing or whether to discard the PDCP SDU and then receive and process the PDCP SDU retransmitted from the AP. For example, the PDCP SDU manager 560 may determine a processing method of the PDCP SDU based on the AP situation, the CP situation, and/or the PDCP SDU characteristic identified by the PDCP SDU analyzer 530. According to an embodiment, when it is determined to process the PDCP SDU through the CP internal processing, the PDCP SDU manager 560 may use the inter-communication protocol stack PDCP SDU deliverer 570 to deliver the PDCP SDU between communication protocol stacks using different types of PDCP versions.

According to various embodiments, the inter-communication protocol stack PDCP SDU deliverer 570 may deliver the PDCP SDU predicted to be lost to a communication protocol stack using a different type of PDCP version. The PDCP SDU predicted to be lost may be already stored in the PDCP buffer 504 of the CP region 503. Alternatively, the PDCP SDU may be already stored in the PDCP buffer 504 in a form of PDCP PDU including a PDCP header. The inter-communication protocol stack PDCP SDU deliverer 570 may perform delivery of the PDCP SDU to a communication protocol stack using a different type of PDCP version by processing the PDCP SDU stored in the PDCP buffer 504 within the PDCP buffer 504.

Figure 13:
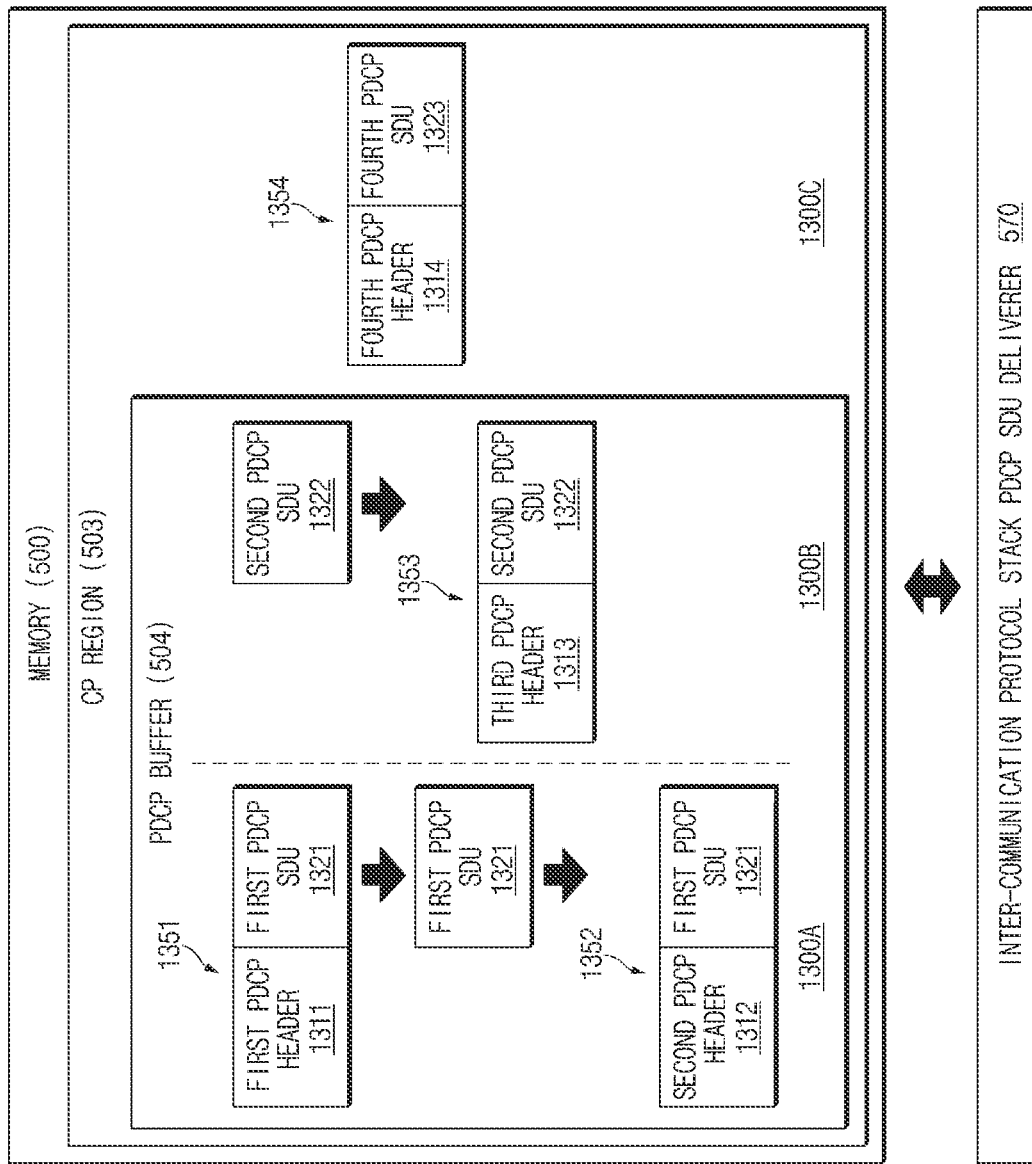
FIG. 13 illustrates a PDCP data delivery method according to various embodiments.

Referring to reference number 1300A of FIG. 13, for example, a PDCP SDU (e.g., a first PDCP SDU 1321) may be stored in the PDCP buffer 504 in a form of PDCP PDU (e.g., a first PDCP PDU 1351). According to an embodiment, the PDCP PDU deliverer 570 may remove a PDCP header (e.g., a first PDCP header 1311) from the first PDCP PDU 1351 and add a PDCP header (e.g., a second PDCP header 1312) corresponding to the first PDCP header 1311 and a different type of PDCP version so as to deliver a PDCP PDU (e.g., a second PDCP PDU 1352) of a different type of version to a protocol stack of a different type of version. In this case, the first PDCP PDU 1321 and the second PDCP PDU 1352 may correspond to PDCP PDUs of different PDCP versions.

Referring to reference number 1300B of FIG. 13, for example, a PDCP SDU (e.g., a second PDCP SDU 1322) may be stored in the PDCP buffer 504 in a form of PDCP SDU. According to an embodiment, the PDCP PDU deliverer 570 may add a PDCP header (e.g., a third PDCP header 1313) corresponding to a different type of PDCP version so as to deliver a PDCP PDU (e.g., a third PDCP PDU 1353) of a different type of version to a protocol stack of a different type of version.

Referring to reference number 1300C of FIG. 13, for example, a PDCP SDU (e.g., a third PDCP SDU 1323) may be stored in the CP region 503 other than the PDCP buffer 504 in the memory 500. For example, the third PDCP SDU 1323 may be stored in a form of PDCP SDU. In this case, a fourth PDCP header 1314 may be omitted. For another example, a PDCP SDU may be stored in a form of PDCP PDU (e.g., a fourth PDCP PDU 1354). The PDCP SDU deliverer 570 may deliver a PDCP SDU or corresponding PDCP PDU between communication protocol stacks of different types by delivering information (e.g., address information of the third PDCP SDU 1323 in the memory 500) of the PDCP SDU.

Referring to FIG. 5, according to an embodiment, when it is determined to process a PDCP SDU through retransmission from the AP, the PDCP SDU manager 560 may delete the PDCP SDU or corresponding PDCP PDU from the PDCP buffer 504 and then may request the AP to retransmit an IP data packet corresponding to the deleted PDCP SDU.

According to an embodiment, the inter-communication protocol stack PDCP SDU deliverer 570 may deliver a PDCP SDU or corresponding PDCP PDU between communication protocol stacks of different types. For example, the inter-communication protocol stack PDCP SDU deliverer 570 may deliver a PDCP SDU or corresponding PDCP PDU based on a determination of the PDCP SDU manager 560.

According to an embodiment, the reverse operator 580 may restore a PDCP SDU from a data packet of a lower layer. When a PDCP SDU is deleted after being delivered from a PDCP layer to a lower layer, although a packet that has failed to be transmitted in an RLC/MAC/PHY layer has not been transmitted to a receiving end, the PDCP SDU may not be present. In this case, the reverse operator 580 may regenerate at least one PDCP SDU from a packet of a lower layer in a reverse order of transmission process. For example, in order to store a regenerated PDCP SDU, the reverse operator 580 may deliver the regenerated PDCP SDU to the PDCP SDU capturer 540 or may store the regenerated PDCP SDU in the PDCP buffer 504.

According to an embodiment, the CP monitor 590 may monitor the situation of the CP, and may report situation information of the CP to the PDCP SDU manager 560. For example, the situation information of the CP may include an amount of unprocessed PDCP SDUs (e.g., amount of identified PDCP SDUs to be lost), a logical channel identifier (LCID) of unprocessed PDCP SDUs, and/or a sequence number (SN) of unprocessed PDCP SDUs when PDCP is changed. For example, the PDCP SDU manager 560 may determine an amount of load of the CP for retransmitting or reprocessing a PDCP SDU, based on the CP situation information. The above-mentioned monitoring information of the CP monitor 590 is an example, and the CP monitor 590 may monitor CP operations associated with processing of non-transmitted and/or unprocessed PDCP SDUs according to a change of PDCP.

Figure 6:
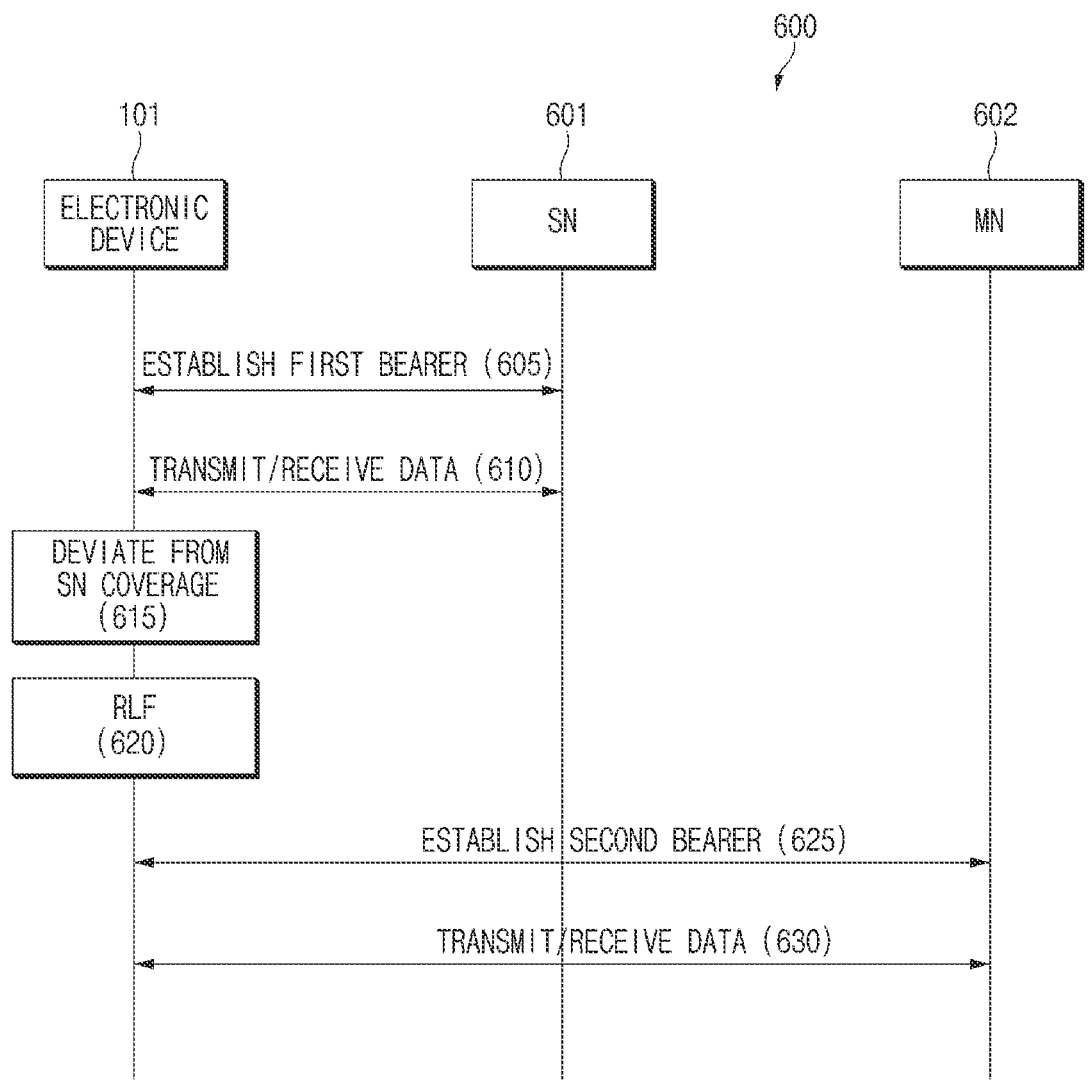
FIG. 6 illustrates a signal flow diagram in a bearer change situation according to various embodiments.

FIG. 6 illustrates a signal flow diagram in a bearer change situation according to various embodiments.

According to various embodiments, the electronic device 101 may transmit/receive data based on an NR PDCP in an MR-DC environment that is based on 5th generation mobile communication NSA. For example, in operation 605, the electronic device 101 may establish a first bearer based on an NR PDCP with a secondary node (SN) 601. In operation 610, the electronic device 101 may transmit/receive data to/from the SN 601 through the established first bearer. In this case, the electronic device 101 may transmit/receive data to/from the SN 601 using a split bearer or SCG bearer. The electronic device 101 may transmit data to the SN 601 through a bearer based on an NR PDCP (e.g., the NR PDCP 313 of FIG. 3). For example, the electronic device 101 (e.g., the PDCP SDU analyzer 530 of FIG. 5) may identify a characteristic of a PDCP SDU when an IP packet generated by an application is delivered to a PDCP layer. Furthermore, the PDCP SDU analyzer 530 may deliver the identified characteristic to a PDCP SDU manager (e.g., the PDCP SDU manager 560 of FIG. 5). For example, the electronic device 101 (e.g., the PDCP SDU manager 560) may determine whether to store the PDCP SDU in a PDCP buffer (e.g., the PDCP buffer 504 of FIG. 5) based on a received PDCP SDU characteristic. Furthermore, the electronic device 101 (e.g., the PDCP SDU manager 560) may determine whether to store the PDCP SDU based on an AP and/or CP situation.

According to various embodiments, in operation 615, the electronic device 101 may deviate from coverage of the SN 601. In this case, in operation 620, the electronic device 101 may declare a radio link failure (RLF). The SN 601 may be released in response to the RLF. In this case, the electronic device 101 (e.g., the PDCP SDU manager 560) may identify a PDCP change based on CP information. For example, the PDCP SDU manager 560 may identify a PDCP SDU that is likely to be lost using the PDCP SDU loss detector 550. The electronic device 101 (e.g., the PDCP SDU manager 560) may determine a processing method of a PDCP SDU based on the AP and/or CP information and the identified PDCP SDU. For example, with regard to a PDCP SDU predicted to be lost, the PDCP SDU manager 560 may determine whether to process the PDCP SDU through CP internal processing or whether to receive and process the PDCP SDU retransmitted from the AP.

According to various embodiments, in operation 625, the electronic device 101 may establish a second bearer with a master node (MN) 602. In operation 630, the electronic device 101 may transmit/receive data to/from the MN 602 through the second bearer. For example, the second bearer may be a bearer (e.g., MCG bearer) based on LTE PDCP.

In the example of FIG. 6, the type of a bearer may be changed based on an RLF. The electronic device 101 may process a PDCP SDU predicted to be lost based on a determination (e.g., processing by using AP or CP) of the PDCP SDU manager 560. For example, when the electronic device 101 determines to process the PDCP SDU predicted to be lost by using the CP, the electronic device 101 may buffer the PDCP SDU predicted to be lost in a PDCP buffer (e.g., the PDCP buffer 504 of FIG. 5) until the second bearer is established. The buffering operation performed by the electronic device 101 may include storing, by the electronic device 101, the PDCP SDU predicted to be lost in the PDCP buffer (e.g., the PDCP buffer 504 of FIG. 5). In this process, the electronic device 101 may use the PDCP SDU stored in the PDCP buffer 504 to transmit the PDCP SDU through the second bearer. For example, after establishing the second bearer, the electronic device 101 may deliver the stored PDCP SDU to a communication protocol stack having a different type of version under control by the inter-communication protocol stack PDCP SDU deliverer 570 so as to transmit the PDCP SDU to the MN 602 through the second bearer. For example, the electronic device 101 may generate a PDCP PDU by adding, to the PDCP SDU stored in the PDCP buffer 504, a header related to a version of changed PDCP (e.g., the E-UTRA PDCP 411 of FIG. 4), and may transmit the PDCP PDU to the MN 602 through lower layers of the changed PDCP. For another example, when the electronic device 101 determines to process data PDCP SDU predicted to be lost by using the AP, the electronic device 101 may delete the PDCP SDU predicted to be lost and may retransmit an IP data packet corresponding to the PDCP SDU from the AP to a PDCP layer (e.g., the PDCP layer 410 of FIG. 4).

According to various embodiments, although not illustrated, the electronic device 101 may store the PDCP SDU predicted to be lost in the PDCP buffer 504 before deviating (operation 615) from the SN coverage. For example, during data transmission/reception through the first bearer (operation 610), if the electronic device 101 estimates that an event (e.g., handover) in which data loss may occur will occur based on a channel state, the electronic device 101 may store the PDCP SDU predicted to be lost in the PDCP buffer 504 from a point of time of the estimation.

Figure 7:
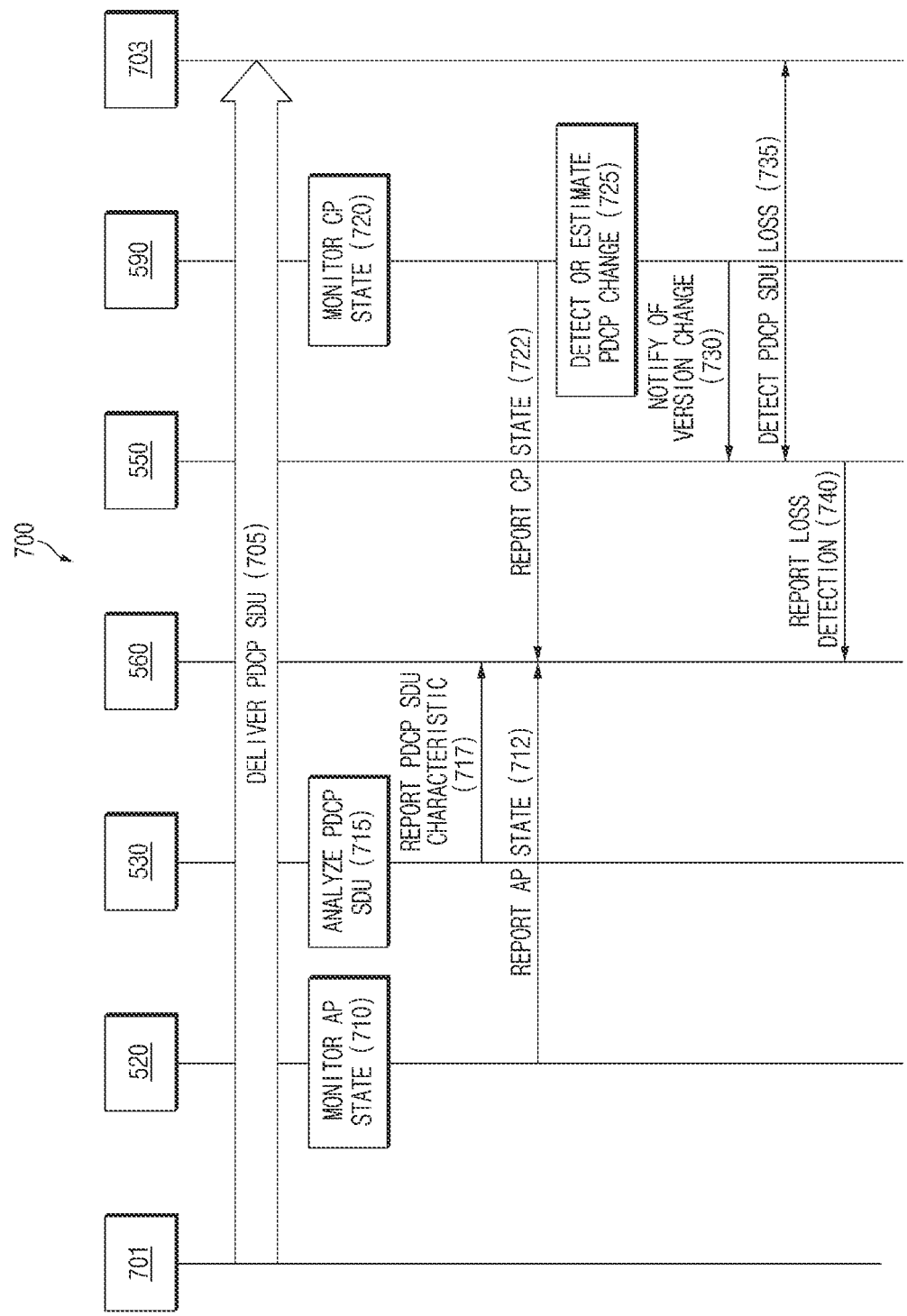
FIG. 7 illustrates a signal flow diagram related to PDCP version change identification according to various embodiments.

FIG. 7 illustrates a signal flow diagram 700 related to PDCP version change identification according to various embodiments.

In operation 705, a PDCP SDU (e.g., IP data packet) may be delivered from an AP 701 to a CP 703. During delivery of the PDCP SDU, the PDCP SDU analyzer 530 may identify a characteristic of the PDCP SDU, and may deliver the identified characteristic to the PDCP SDU manager 560. For example, the PDCP SDU may be processed based on the second communication protocol stack 316. For example, operation 705 may correspond to the data transmission/reception through the first bearer (e.g., operation 610) of FIG. 6.

According to an embodiment, the AP monitor 520 may monitor an AP state in operation 710, and may report the AP state to the PDCP SDU manager 560 in operation 712.

According to an embodiment, the PDCP SDU analyzer 530 may identify the characteristic of the PDCP SDU in operation 715, and may report the identified characteristic to the PDCP SDU manager 560 in operation 717.

According to an embodiment, the CP monitor 590 may monitor a CP state in operation 720, and may report the CP state to the PDCP SDU manager 560 in operation 722.

Operation 710 to operation 722 may be performed during the PDCP SDU delivery of operation 705, and may be performed substantially simultaneously. An order in which operation 710 to operation 722 are performed is not limited by reference numbers related to the operations.

According to various embodiments, the CP monitor 590 may detect or estimate a PDCP version change in operation 725. For example, the CP monitor 590 may detect a PDCP version change by sensing an addition or release of a secondary node (SN). For another example, the CP monitor 590 may estimate a PDCP version change based on a communication state (e.g., RSSI and/or SINR). For another example, the CP monitor 590 may estimate a PDCP version change based on an RLC ARQ state or HARQ state. The CP monitor 590 may detect a PDCP version change based on deviation (e.g., operation 615 of FIG. 6) of the electronic device 101 from the SN coverage or an RLF (e.g., operation 620 of FIG. 6).

According to various embodiments, in response to detection or estimation of a PDCP version change, the CP monitor 725 may notify the version change to the PDCP SDU loss detector 550. In operation 735, the PDCP SDU loss detector 550 may identify a PDCP SDU predicted to be lost based on the PDCP version change. When a PDCP SDU predicted to be lost is present, the PDCP SDU loss detector 550 may report the detection of loss to the PDCP SDU manager 560.

Figure 8:
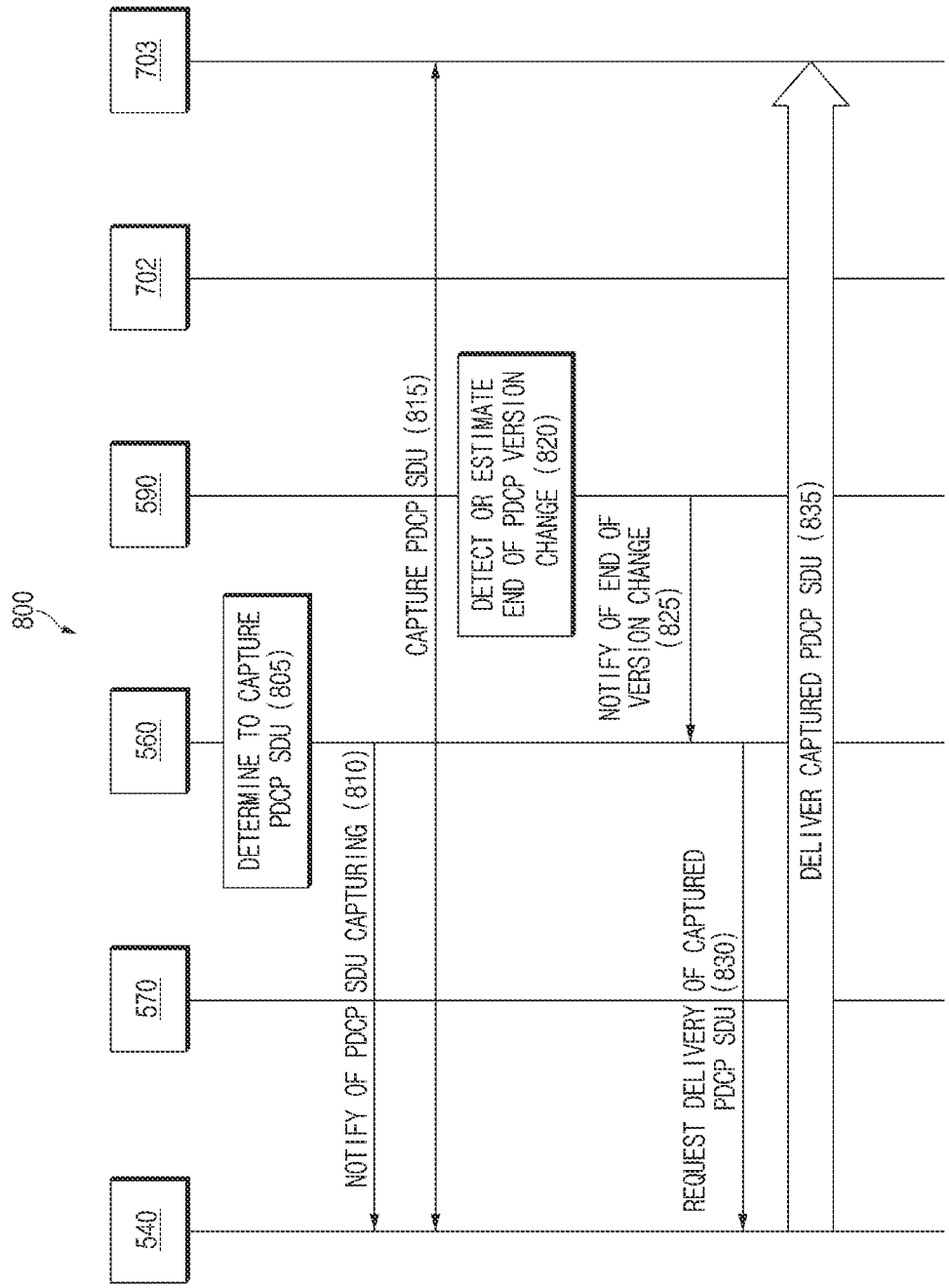
FIG. 8 illustrates a signal flow diagram related to a PDCP SDU transmission method according to various embodiments.

FIG. 8 illustrates a signal flow diagram 800 related to a PDCP SDU transmission method according to various embodiments.

According to an embodiment, the PDCP SDU manager 560 may determine to process a PDCP SDU predicted to be lost in the CP 703, based on at least one of the reports described above with reference to FIG. 7.

According to various embodiments, in operation 805, the PDCP SDU manager 560 may determine to capture a PDCP SDU. For example, the PDCP SDU manager 560 may determine to capture a PDCP SDU in response to detection or estimation (e.g., operation 725 of FIG. 7) of a PDCP version change. For another example, the PDCP SDU manager 560 may determine to capture a PDCP SDU based on a PDCP SDU characteristic report (e.g., operation 717 of FIG. 7).

According to various embodiments, in operation 810, the PDCP SDU manager 560 may deliver a PDCP SDU capture notification to the PDCP SDU capturer 540. In operation 815, the PDCP SDU capturer 540 may capture a PDCP SDU. For example, the PDCP SDU capturer 540 may store a PDCP SDU in a PDCP buffer (e.g., the PDCP buffer 504 of FIG. 5). According to an embodiment, capturing of a PDCP SDU may include reverse conversion of a packet that is present in a lower layer of a PDCP layer into a PDCP SDU.

According to various embodiments, in operation 820, the CP monitor 590 may detect or estimate an end of PDCP version change. For example, the end of PDCP version change may correspond to completion of establishment of the second bearer (e.g., operation 625 of FIG. 6). In operation 825, the CP monitor 590 may notify the end of PDCP version change to the PDCP SDU manager 560.

According to various embodiments, in operation 830, the PDCP SDU manager 560 may request the PDCP SDU capturer 540 to deliver a captured PDCP SDU. In operation 835, the PDCP SDU capturer 540 may deliver, to a protocol stack corresponding to the second bearer, a captured PDCP SDU through PDCP SDU delivery between communication network protocol stacks under control by the inter-communication protocol stack PDCP SDU deliverer 570. For example, the inter-communication protocol stack PDCP SDU deliverer 570 may deliver the PDCP SDU to the protocol stack corresponding to the second bearer by processing the PDCP SDU (e.g., adding a PDCP header corresponding to the second bearer) stored in the PDCP buffer 504 by the PDCP SDU capturer 540. For example, the inter-communication protocol stack PDCP SDU deliverer 570 may deliver the PDCP SDU to the protocol stack corresponding to the second bearer by deleting a PDCP header of the PDCP PDU corresponding to the first bearer, stored in the PDCP buffer 504, and adding the PDCP header corresponding to the second bearer. For another example, the inter-communication protocol stack PDCP SDU deliverer 570 may deliver information (e.g., address information) of a PDCP SDU stored in a memory region other than the PDCP buffer 504 to the protocol stack corresponding to the second bearer. The electronic device 101 may transmit data through the second bearer based on the delivered PDCP SDU (e.g., operation 630 of FIG. 6).

Figure 9:
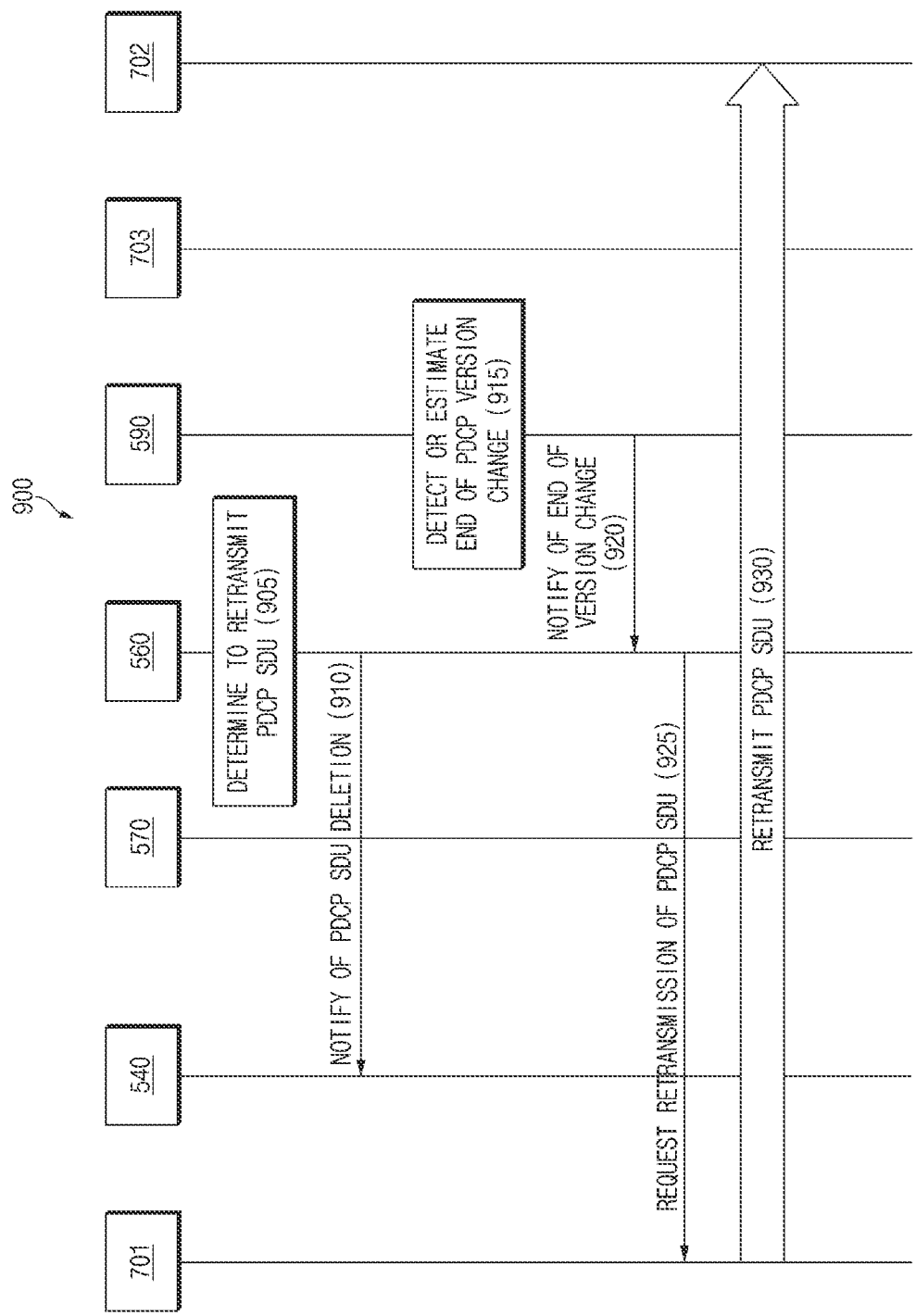
FIG. 9 illustrates a signal flow diagram related to a PDCP SDU retransmission method according to various embodiments.

FIG. 9 illustrates a signal flow diagram related to a PDCP SDU retransmission method according to various embodiments.

According to an embodiment, in operation 905, the PDCP SDU manager 560 may determine to retransmit a PDCP SDU from the AP 701, based on at least one of the reports described above with reference to FIG. 7. For example, when a PDCP SDU to be lost is a TCP-based data packet based on a loss detection report (e.g., operation 740 of FIG. 7) and PDCP SDU characteristic report (e.g., operation 717 of FIG. 7), the PDCP SDU manager 560 may determine to retransmit the PDCP SDU from the AP 701.

According to various embodiments, in operation 910, the PDCP SDU manager 560 may notify deletion of the stored PDCP SDU to the PDCP SDU capturer 540.

According to various embodiments, in operation 915, the CP monitor 590 may detect or estimate an end of PDCP version change. For example, the end of PDCP version change may correspond to completion of establishment of the second bearer (e.g., operation 625 of FIG. 6). In operation 920, the CP monitor 590 may notify the end of PDCP version change to the PDCP SDU manager 560.

According to various embodiments, in operation 925, the PDCP SDU manager 560 may request the AP 701 to retransmit a PDCP SDU estimated to be lost. In operation 930, the AP 701 may retransmit the requested PDCP SDU by retransmitting a requested IP data packet. In this case, the CP 702 may process a received IP data packet according to a network protocol stack corresponding to a changed PDCP version.

Described above with reference to FIGS. 6 to 9 are methods of processing a PDCP SDU estimated to be lost when the electronic device 101 is handed over from the SN 601 corresponding to an NR cell to the MN 602 corresponding to an E-UTRA cell. However, embodiments of the present disclosure are not limited thereto.

According to an embodiment, the electronic device 101 may be handed over from an E-UTRA cell to an NR cell supporting MR-DC. In this case, since an MC bearer associated with an E-UTRA PDCP is changed to a SCG bearer or split bearer of NR, there may be a residual PDCP SDU. In this case, the same embodiments as described above with reference to FIGS. 6 to 9 may be applied, except for a communication network protocol stack.

According to an embodiment, a bearer of the electronic device 101 may be changed, according to a configuration update based on network preference, from an MCG bearer based on E-UTRA PDCP to an MCG bearer based on NR PDCP in an E-UTRA cell supporting MR-DC. In this case, the PDCP SDU loss detector 550 may identify a PDCP SDU to be lost due to a PDCP version change. The PDCP SDU manager 560 may deliver the PDCP SDU to be lost to an NR protocol stack. Therefore, E-UTRA PDCP SDUs may be retransmitted through an NR PDCP SDU.

According to an embodiment, the electronic device 101 may determine to re-process or retransmit a PDCP SDU even when a bearer or a security key of PDCP is changed without changing RAT. For example, when successful reception by a receiving end is impossible due to a change of the PDCP security key, the PDCP SDU manager 560 may generate a changed PDCP SDU by using a changed security key from a PDCP SDU stored in the PDCP buffer 504. The electronic device 101 may retransmit the PDCP SDU corresponding to the changed key through a corresponding protocol stack. For another example, in response to a change of a bearer, the PDCP SDU manager 560 may generate a PDCP PDU corresponding to the changed bearer from a PDCP SDU stored in the PDCP buffer 504, and may retransmit the generated PDCP PDU through a corresponding protocol stack. Likewise, when packet retransmission is performed in the same bearer according to a bearer reconfiguration procedure on the same RAT, the PDCP SDU manager 560 may identify a PDCP SDU to be lost according to a procedure similar to that described above, and may re-process or retransmit the identified PDCP SDU.

Figure 10:
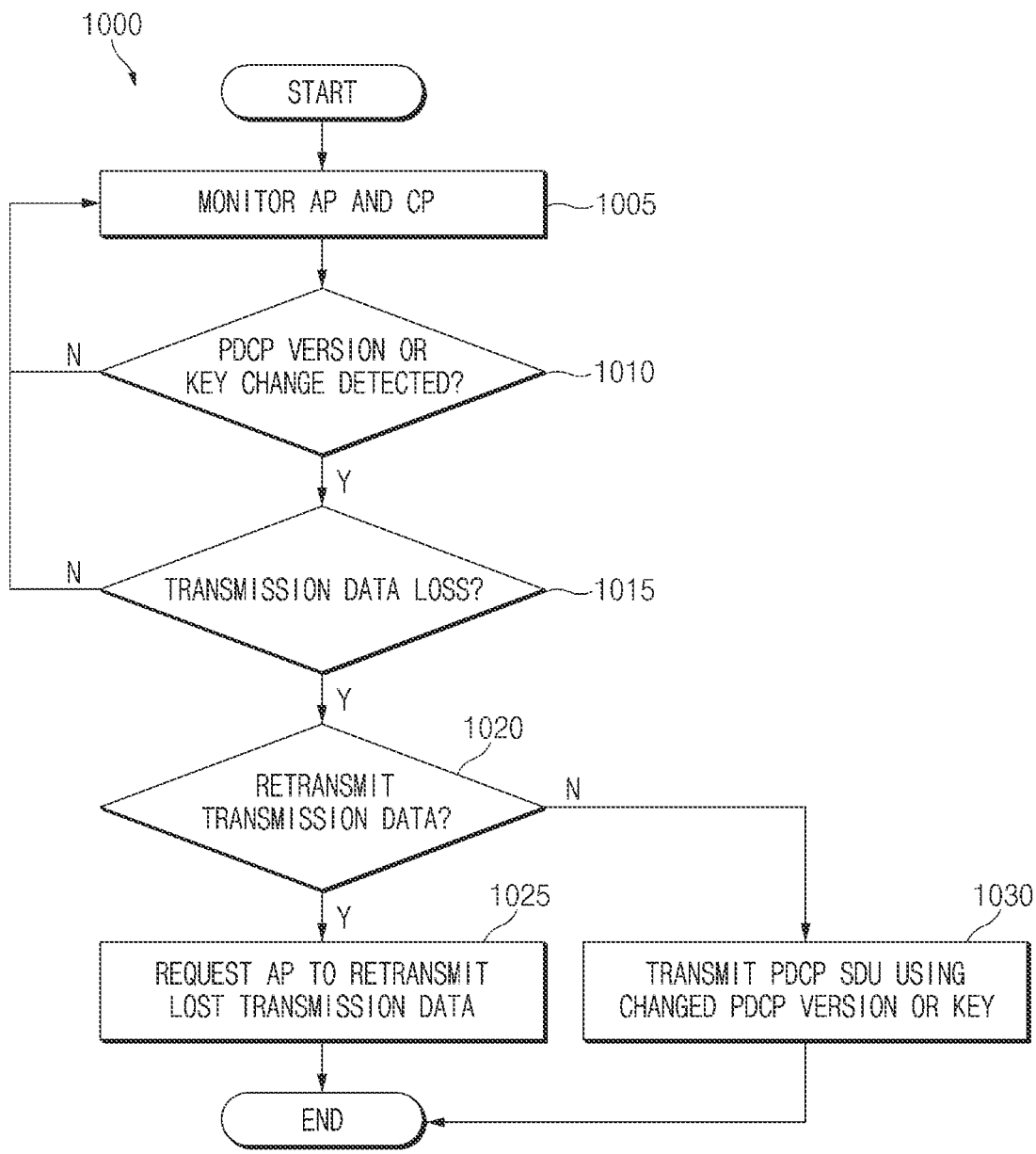
FIG. 10 is a flowchart illustrating a PDCU SDU transmission method according to various embodiments.

FIG. 10 is a flowchart 1000 illustrating a PDCP SDU transmission method according to various embodiments.

According to various embodiments, at least one processor (e.g., the processor 120 and/or communication module 190 of FIG. 1) of the electronic device 101 may monitor an AP and CP in operation 1005. For example, the operation of the AP monitor 520 and CP monitor 590 of FIG. 5 may be referenced for operation 1005.

According to various embodiments, in operation 1010, the at least one processor may determine whether a PDCP version or key (e.g., security key of PDCP layer) change event is detected based on a result of monitoring the AP and/or CP. If the PDCP version change or key change event is not detected, the at least one processor may continue to monitor the AP and CP.

According to various embodiments, in operation 1015, if the PDCP version change or key change event is detected, the at least one processor may determine whether transmission data is lost in response to a detected event. For example, the at least one processor may determine that data to be lost is present if there is transmission data that was delivered from a PDCP layer to a lower layer but was not transmitted or acknowledgement thereof was not received.

According to various embodiments, when data to be lost is present, the at least one processor may determine whether to retransmit transmission data in operation 1020. For example, the at least one processor may determine whether to retransmit based on a characteristic of the data to be lost. For example, if a transmission protocol of the data to be lost is TCP, the at least one processor may determine to retransmit the transmission data. For another example, if a transmission protocol of the data to be lost is UDP, the at least one processor may determine to re-process the transmission data.

According to various embodiments, if it is determined to retransmit the transmission data, the at least one processor may request the AP to retransmit the lost transmission data in operation 1025. If it is determined to re-process the transmission data, the at least one processor may re-process and transmit a PDCP SDU using a changed PDCP version or key in operation 1030.

Figure 11:
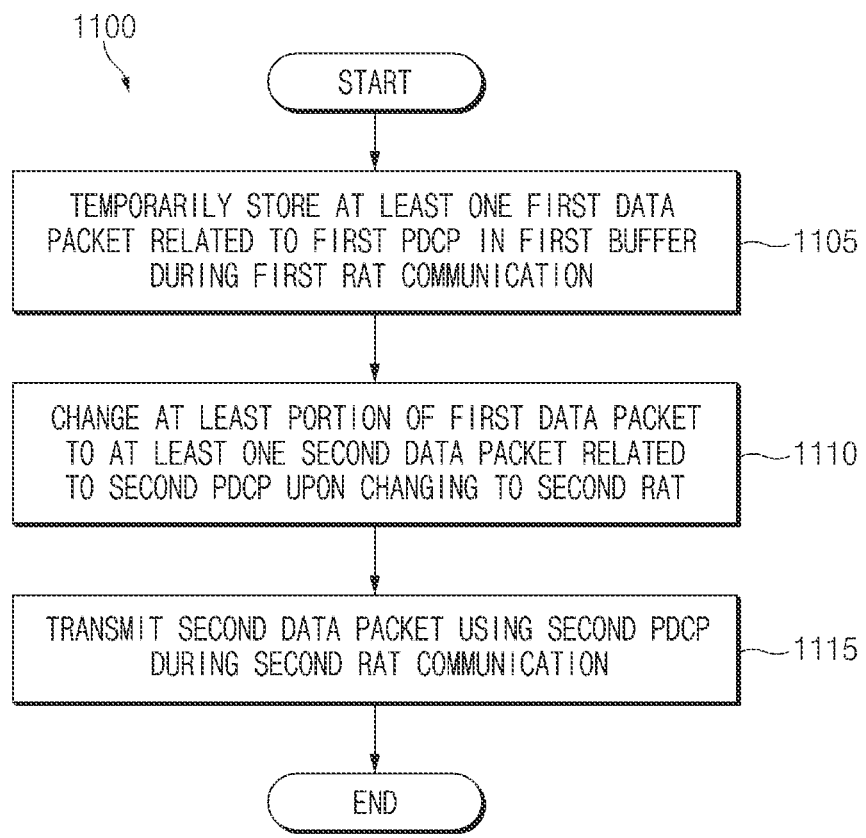
FIG. 11 is a flowchart illustrating a method for transmitting a data packet of changed PDCP according to various embodiments.

FIG. 11 is a flowchart illustrating a method for transmitting a data packet of changed PDCP according to various embodiments.

According to various embodiments, an electronic device (e.g., the electronic device 101 of FIG. 1) may include: at least one wireless communication circuit (e.g., the communication module 190 of FIG. 1) configured to provide a first radio access technology (RAT) and a second RAT; at least one processor (e.g., the communication module 190 and/or processor 120 of FIG. 1) operatively connected to the at least one wireless communication circuit and configured to provide a first packet data convergence protocol (PDCP) related to the first RAT and a second PDCP related to the second RAT; a volatile memory (e.g., the volatile memory 132 of FIG. 1) operatively connected to the at least one processor and including, in at least a partial region thereof, a first buffer; and a nonvolatile memory (e.g., the nonvolatile memory 134 of FIG. 1) operatively connected to the at least one processor or coupled to the processor.

For example, the nonvolatile memory may store instructions that, when executed, cause the at least one processor to perform the operations described below.

According to various embodiments, in operation 1105, the at least one processor may store, during wireless communication based on the first RAT, at least one first data packet related to the first PDCP in the first buffer (e.g., the PDCP buffer 504) at least temporarily. For example, the at least one first data packet may include at least one first packet header including an identifier related to the first PDCP and at least one service data unit (SDU). For example, the at least one first data packet may be a user datagram protocol (UDP) packet.

According to various embodiments, in operation 1110, the at least one processor, when the wireless communication is changed to wireless communication based on the second RAT, may change at least a portion of the stored at least one first data packet to at least one second data packet related to the second PDCP.

According to various embodiments, in operation 1115, the at least one processor may transmit the at least one second data packet using the second PDCP during the wireless communication based on the second RAT. For example, the at least one second data packet may include at least one second packet header including an identifier related to the second PDCP and the at least one SDU of the at least one first data packet.

According to an embodiment, the at least one processor may change at least a portion of the stored at least one first data packet to at least one second data packet related to the second PDCP by removing the at least one first packet header from the at least one first data packet and adding the at least one second packet header to the at least one first data packet from which the at least one first packet header has been removed.

Figure 12:
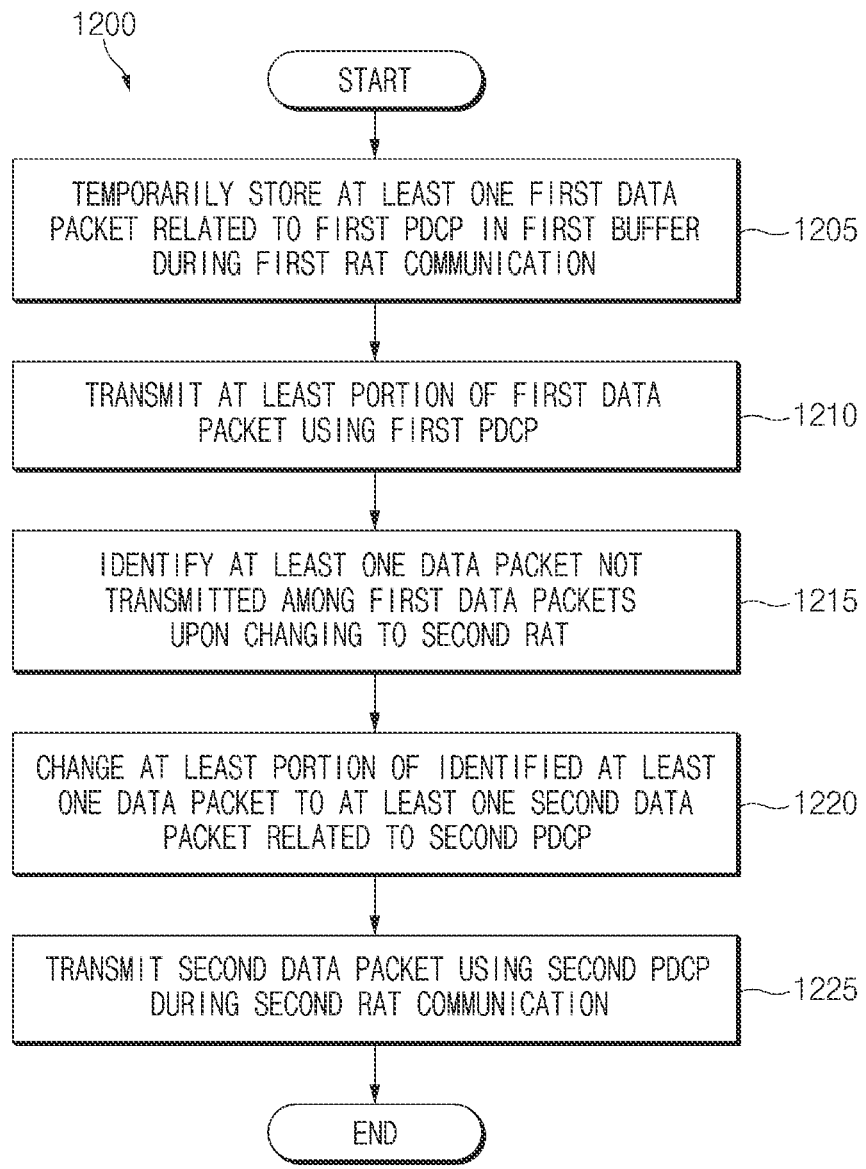
FIG. 12 is a flowchart illustrating a method for transmitting a data packet in a PDCP change situation according to various embodiments.

FIG. 12 is a flowchart 1200 illustrating a method for transmitting a data packet in a PDCP change situation according to various embodiments.

According to various embodiments, an electronic device (e.g., the electronic device 101 of FIG. 1) may include: at least one wireless communication circuit (e.g., the communication module 190 of FIG. 1) configured to provide a first radio access technology (RAT) and a second RAT; at least one processor (e.g., the communication module 190 and/or processor 120 of FIG. 1) operatively connected to the at least one wireless communication circuit and configured to provide a first packet data convergence protocol (PDCP) related to the first RAT and a second PDCP related to the second RAT; a volatile memory (e.g., the volatile memory 132 of FIG. 1) operatively connected to the at least one processor and including, in at least a partial region thereof, a first buffer; and a nonvolatile memory (e.g., the nonvolatile memory 134 of FIG. 1) operatively connected to the at least one processor or coupled to the processor.

For example, the nonvolatile memory may store instructions that, when executed, cause the at least one processor to perform the operations described below.

According to various embodiments, in operation 1205, the at least one processor may store, during wireless communication based on the first RAT, a plurality of first data packets related to the first PDCP in the first buffer at least temporarily.

According to various embodiments, in operation 1210, the at least one processor may transmit at least a portion of the plurality of first data packets using the first PDCP. For example, the at least one first data packet may include at least one first packet header including an identifier related to the first PDCP and at least one service data unit (SDU). For example, the at least one first data packet may be a user datagram protocol (UDP) packet.

According to various embodiments, in operation 1215, the at least one processor, when the wireless communication is changed to wireless communication based on the second RAT, may identify at least one first data packet not transmitted among the plurality of first data packets.

According to various embodiments, in operation 1220, the at least one processor may change the identified at least one first data packet to at least one second data packet related to the second PDCP. For example, the at least one second data packet may include at least one second packet header including an identifier related to the second PDCP and the at least one SDU of the at least one first data packet. According to an embodiment, the at least one processor may change at least a portion of the stored at least one first data packet to at least one second data packet related to the second PDCP by removing the at least one first packet header from the at least one first data packet and adding the at least one second packet header to the at least one first data packet from which the at least one first packet header has been removed.

According to various embodiments, in operation 1225, the at least one processor may transmit the at least one second data packet using the second PDCP during the wireless communication based on the second RAT.

According to various embodiments, an electronic device (e.g., the electronic device 101 of FIG. 1) may include: at least one wireless communication circuit (e.g., the communication module 190 of FIG. 1) configured to provide a first radio access technology (RAT) (e.g., E-UTRA or NR) and a second RAT (e.g., RAT different from the first RAT); at least one processor (e.g., the wireless communication module 192 of FIG. 1) (e.g., communication processor) operatively connected to the at least one wireless communication circuit and configured to provide a first packet data convergence protocol (PDCP) related to the first RAT and a second PDCP related to the second RAT; a volatile memory (e.g., the volatile memory 132 of FIG. 1) operatively connected to the at least one processor and including, in at least a partial region thereof, a first buffer; and a nonvolatile memory (e.g., the nonvolatile memory 134 of FIG. 1) operatively connected to the at least one processor or coupled to the processor. According to an embodiment, the nonvolatile memory may store one or more instructions that, when executed, cause the at least one processor to perform the operations of the electronic device described below.

According to an embodiment, the electronic device may store, during wireless communication based on the first RAT, at least one first data packet related to the first PDCP in the first buffer (e.g., the common region 502 or PDCP buffer 504 of FIG. 5) at least temporarily, may change at least a portion of the stored at least one first data packet to at least one second data packet related to the second PDCP when the wireless communication is changed to wireless communication based on the second RAT, and may transmit the at least one second data packet using the second PDCP during the wireless communication based on the second RAT. For example, the at least one first data packet may include at least one first packet header including an identifier related to the first PDCP and at least one service data unit (SDU). For example, the at least one second data packet may include at least one second packet header including an identifier related to the second PDCP and the at least one SDU. For example, the at least one first data packet may be a user datagram protocol (UDP) packet.

According to an embodiment, the electronic device may change at least a portion of the stored at least one first data packet to at least one second data packet related to the second PDCP by removing the at least one first packet header from the at least one first data packet and adding the at least one second packet header to the at least one first data packet from which the at least one first packet header has been removed.

According to various embodiments, an electronic device (e.g., the electronic device 101 of FIG. 1) may include: at least one wireless communication circuit (e.g., the communication module 190 of FIG. 1) configured to provide a first radio access technology (RAT) (e.g., E-UTRA or NR) and a second RAT (e.g., RAT different from the first RAT); a processor (e.g., communication processor and/or application processor) operatively connected to the at least one wireless communication circuit; and a memory (e.g., the memory 130 of FIG. 1) operatively connected to the at least one processor. According to an embodiment, the nonvolatile memory may store one or more instructions that, when executed, cause the at least one processor to perform the operations of the electronic device described below.

According to an embodiment, the electronic device may store instructions that cause the electronic device to: transmit at least a portion of a plurality of first data packets based on a first packet data convergence protocol (PDCP); identify an event corresponding to changing from the first PDCP to a second PDCP while transmitting the plurality of first data packets; identify, in response to identification of the event, at least one first data packet that is likely to be lost due to the changing to the second PDCP; and determine to retransmit or store the at least one first data packet at least partially based on an attribute of the at least one first data packet. For example, the attribute of the at least one first data packet may include a transmission protocol of an Internet protocol (IP) packet associated with the at least one first data packet.

According to an embodiment, the electronic device may identify the event by identifying a change of the type of a bearer, a version of PDCP, or a security key of PDCP.

According to an embodiment, the electronic device may identify the event by estimating a handover or radio link failure (RLF) based on a communication state of the electronic device.

According to an embodiment, the electronic device may identify, as the at least one first data packet among the plurality of first data packets, data that was delivered from a PDCP layer to a lower layer but was not transmitted in a physical layer or data for which an acknowledgement response was not received in an acknowledged mode of radio link control (RLC).

According to an embodiment, the electronic device may store the at least one first data packet in the memory when the transmission protocol of the IP packet is a user datagram protocol (UDP).

According to an embodiment, the electronic device, after the changing to the second PDCP, may process the stored at least one first data packet according to the second PDCP.

According to an embodiment, the electronic device may determine to retransmit the at least one first data packet when the transmission protocol of the IP packet is a transmission control protocol (TCP).

According to various embodiments, a data transmission method of an electronic device (e.g., the electronic device 101 of FIG. 1) may include: transmitting at least a portion of a plurality of first data packets based on a first packet data convergence protocol (PDCP); identifying an event corresponding to changing from the first PDCP to a second PDCP while transmitting the plurality of first data packets; identifying, in response to identification of the event, at least one first data packet that is likely to be lost due to the changing to the second PDCP among the plurality of first data packets; and determining to retransmit or store the at least one first data packet at least partially based on an attribute of the at least one first data packet.

For example, the identifying of the event may include identifying a change of the type of a bearer, a version of PDCP, or a security key of PDCP. For another example, the identifying of the event may include estimating a handover or radio link failure (RLF) based on a communication state of the electronic device.

According to an embodiment, the identifying of the at least one first data packet that is likely to be lost may include identifying, as the at least one first data packet among the plurality of first data packets, data that was delivered from a PDCP layer to a lower layer but was not transmitted in a physical layer or data for which an acknowledgement response was not received in an acknowledged mode of radio link control (RLC).

For example, the attribute of the at least one first data packet may include a transmission protocol of an Internet protocol (IP) packet associated with the at least one first data packet.

According to an embodiment, the determining to retransmit or store the at least one first data packet may include storing the at least one first data packet in a memory of the electronic device when the transmission protocol of the IP packet is a user datagram protocol (UDP).

For example, the method may further include processing and transmitting the stored at least one first data packet after the changing to the second PDCP.

The invention claimed is:

1. An electronic device comprising:
   at least one wireless communication circuit configured to provide a first radio access technology (RAT) and a second RAT;
   a processor operatively connected to the at least one wireless communication circuit; and
   a memory operatively connected to the processor, wherein the memory stores instructions, and the processor is configured to:
   detect a packet data convergence protocol (PDCP) change from a first PDCP to a second PDCP at least by detecting a change in a PDCP version and/or in a PDCP key,
   identify, in response to detected PDCP change, at least one first data packet that is delivered from a PDCP layer to a lower layer and has not been transmitted by the electronic device, and
   when a transmission protocol of the at least one first data packet is a user datagram protocol, UDP, determine to reprocess the at least one first data packet by:
   storing the at least one first data packet in a buffer,
   changing at least a portion of the first data packet to at least one second data packet related to the second PDCP, and
   transmitting the at least one second data packet.

2. The electronic device of claim 1, wherein the instructions, when executed, cause the processor to determine to retransmit the at least one first data packet when the transmission protocol of the at least one first data packet is a transmission control protocol TCP.

3. A data transmission method of an electronic device, comprising:
   detecting a packet data convergence protocol (PDCP) change from a first PDCP to a second PDCP by detecting a change in a PDCP version or in a PDCP key,
   identifying, in response to the detected PDCP change, at least one first data packet that is delivered from a PDCP layer to a lower layer and has not been transmitted by the electronic device;
   when a transmission protocol of the at least one first data packet is a user datagram protocol, UDP, determining to reprocess the at least one first data packet; and reprocessing the at least one first data packet by storing the at least one first data packet in a buffer, changing at least portion of the first data packet to at least one second data packet related to the second PDCP, and transmitting the at least one second data packet.

4. The data transmission method of claim 3, further comprising: determining to retransmit the at least one first data packet when the transmission protocol of the at least one first data packet is a transmission control protocol, TCP.

* * * * *